(12) United States Patent
Kuse

(10) Patent No.: US 7,755,810 B2
(45) Date of Patent: Jul. 13, 2010

(54) IMAGE READING APPARATUS

(75) Inventor: Kazutoshi Kuse, Nagoya (JP)

(73) Assignee: Brother Kogyo Kabushiki Kaisha, Nagoya-shi, Aichi-shi (JP)

( * ) Notice: Subject to any disclaimer, the term of this patent is extended or adjusted under 35 U.S.C. 154(b) by 418 days.

(21) Appl. No.: 11/749,272

(22) Filed: May 16, 2007

(65) Prior Publication Data

US 2007/0268529 A1    Nov. 22, 2007

(30) Foreign Application Priority Data

May 16, 2006    (JP)    ............... 2006-136159

(51) Int. Cl.
*H04N 1/04*    (2006.01)
(52) U.S. Cl. .............. 358/474; 358/496; 358/497; 358/483
(58) Field of Classification Search .......... 358/497, 358/494, 483, 482, 474, 496, 505, 512–514; 399/211; 382/312, 318, 319; 250/208.1, 250/234–236, 239, 216; 235/454
See application file for complete search history.

(56) References Cited

U.S. PATENT DOCUMENTS

| | | | |
|---|---|---|---|
| 6,512,602 B1 * | 1/2003 | Sheng et al. | ............... 358/498 |
| 7,055,743 B2 * | 6/2006 | Youngers | ............... 235/454 |
| 7,251,062 B2 * | 7/2007 | Harris et al. | ............... 358/497 |
| 2003/0081268 A1 | 5/2003 | Hirayama | |

FOREIGN PATENT DOCUMENTS

| | | |
|---|---|---|
| JP | 6141143 | 5/1994 |
| JP | 8-228266 A | 9/1996 |
| JP | 9-90527 A | 4/1997 |
| JP | 10-186535 A | 7/1998 |
| JP | 11-122427 A | 4/1999 |
| JP | 11289430 | 10/1999 |
| JP | 2003-143377 A | 5/2003 |
| JP | 2003-283767 A | 10/2003 |

OTHER PUBLICATIONS

JP Office Action dtd May 7, 2008, JP App 2006-136159.
JP Office Action Aug. 26, 2008, JP App 2006-136159.

* cited by examiner

*Primary Examiner*—Cheukfan Lee
(74) *Attorney, Agent, or Firm*—Banner & Witcoff, Ltd.

(57) ABSTRACT

According to an aspect of the invention, there is provided an image reading apparatus including: a first plate including a stationary document reading region; an image reader configured to scan a document on the first plate; a carriage supporting the image reader in a state that the carriage keeps the image reader predetermined distance from the first plate; and a guiding member that makes the image reader move downwardly by contacting an edge of the first plate.

16 Claims, 17 Drawing Sheets

IMAGE READING APPARATUS

CROSS-REFERENCE TO RELATED APPLICATIONS

This application is based on and claims the benefit of priority from the prior Japanese Patent Application No. 2006-136159, filed on May 16, 2006; the entire contents of which are incorporated herein by reference.

TECHNICAL FIELD

The present invention relates to an image reading apparatus that includes a first plate, which forms a moving document reading region, and second plate, which forms a stationary document reading region, and reads an image of a document, placed on the first plate or the second plate, by receiving reflected light from the document by an image reader.

BACKGROUND

Image reading apparatuses, which scan image data of a document by a CIS (Contact Image Sensor), CCD (Charge Coupled Device), or other image sensor, have been known. Among the type of image reading apparatuses, for example, JP-A-6-141143 discloses a well-known image reading apparatus has both a moving document reading function and a stationary document reading function. The moving document reading function is to continuously scanned a document transferred (a moving document) in a process by use of a document transfer system, so-called an ADF (Auto Document Feeder). The stationary document reading function is to scan an image of a document (stationary document), placed on an upper surface of a main apparatus unit, by scanning a surface of the document.

Image reading by the stationary document reading function is performed as follows. That is, a document is placed on a stationary document reading glass (referred to hereinafter as "second glass") and is pressed onto the front face of the second glass by a document cover. With the document thus being put in the stationary state, the image reading unit scans the surface of the stationary document while moving onto a back surface of the second glass in a width direction of the apparatus to read an image of the stationary document.

In performing image reading by the stationary document reading function, a book, magazine, or other book-like document (referred to hereinafter as "book document") is placed on the second glass, a central portion of the second glass is deformed downward by the weight of the book document. In a case where an image of a double-page spread of a book, magazine, or other book-like document is to be read, a user presses the book document strongly onto the second glass in order to prevent the forming of a shadow at a central portion of the double-page spread. The second glass near a center in the depth direction of the apparatus is deformed downward by such a pressing act as well. Such deflection of the second glass obstructs the reading operation by the image reading unit and is a cause of degradation of the image quality of the read image. The back surface of the second glass may also contact the image reading unit and the image reading unit may be damaged thereby.

JP-A-11-289430 discloses an image reading apparatus, having a contact preventing means that keeps fixed an interval between a document base glass (serving as the above-described second glass) and a reading unit (serving as the above-described image reader) and thereby prevents contacting of the document base glass with the reading unit even when the document base glass becomes deformed.

SUMMARY

According to an aspect of the invention, there is provided an image reading apparatus including: a first plate including a stationary document reading region; an image reader configured to scan a document on the first plate; a carriage supporting the image reader in a state that the carriage keeps the image reader predetermined distance from the first plate; and a guiding member that makes the image reader move downwardly by contacting an edge of the first plate.

BRIEF DESCRIPTION OF THE DRAWINGS

In the accompanying drawings.

DESCRIPTION OF ILLUSTRATIVE ASPECTS

With the image reading apparatus of the arrangement in which the first glass and the second glass are disposed separately on the upper surface of the main apparatus unit, an end (referred to hereinafter as "adjacent end") of the second glass that is adjacent the first glass is not supported by the main apparatus unit. Thus, when the second glass is deformed downward, the adjacent end deforms more downward than the first glass and a step is formed with respect to the first glass. Meanwhile with the image reading apparatus, before image reading process by the stationary document reading function, the image reading unit is moved to a position, so-called home position, and is moved away from the second glass. In general, the home position is set at a position substantially below the first glass or a device placed outside of the second glass. However, when the step forms between the first glass and the second glass, the image reading unit that moves from the home position to the second glass in the image reading process by the stationary document reading function may hit the step and may become damaged.

Illustrative aspects of the present invention, there is provide an image reading apparatus capable of preventing an image reading unit from being damaged due to a step that is formed by deformation of a glass.

Illustrative aspects of the present invention shall now be described with reference to the drawings where appropriate. The illustrative aspects are merely examples of the present invention, and the illustrative aspects can obviously be changed as suited within a scope in which the aspect of the invention is not changed.

Figure 2:
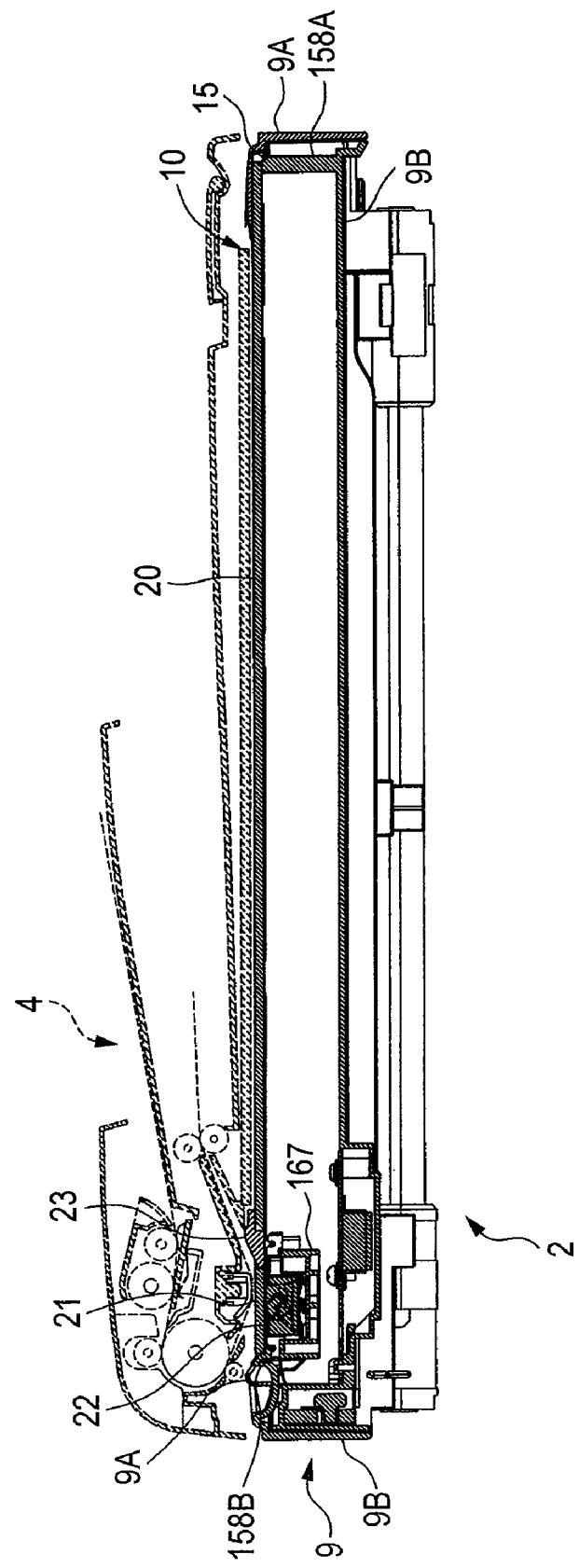
FIG. 2 is an exemplary sectional view taken on section line II-II of FIG. 1.
Figure 3:
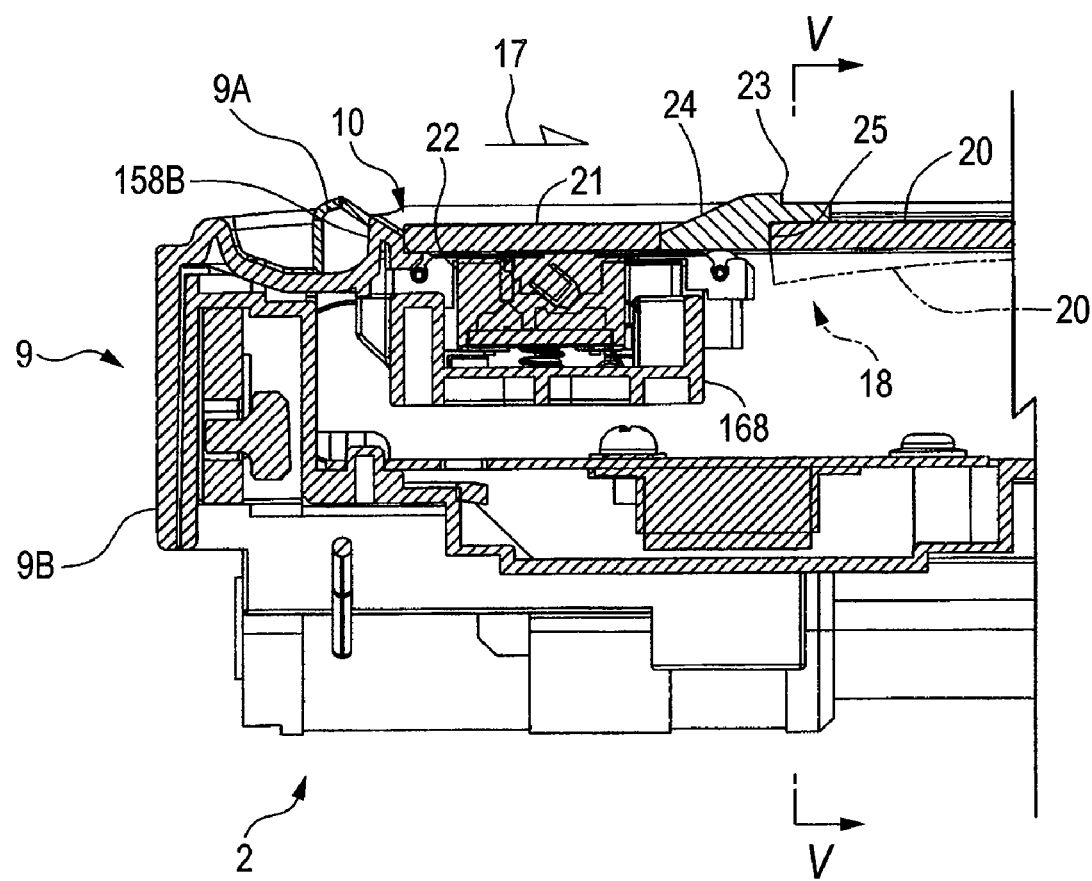
FIG. 3 is an exemplary partially enlarged sectional view of a portion near a left end of a document reading placing table.
Figure 4:
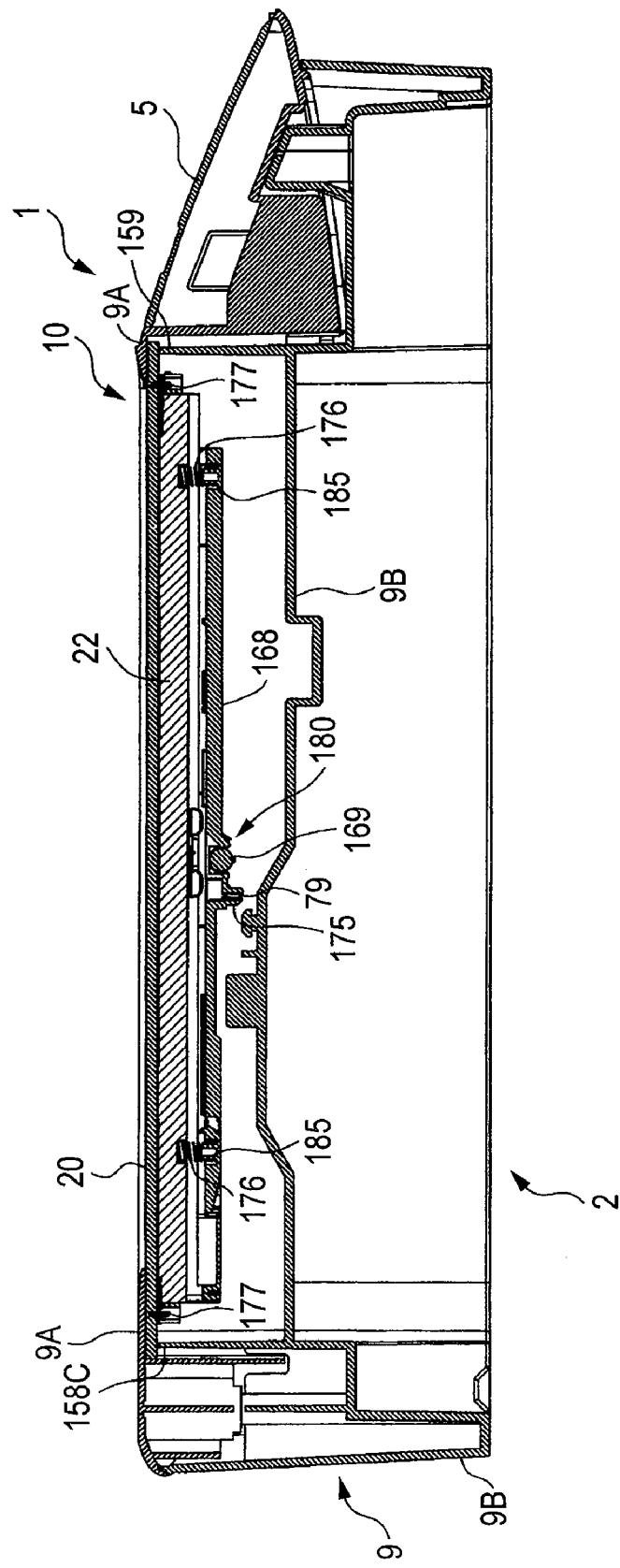
FIG. 4 is an exemplary sectional view taken on section line IV-IV of FIG. 1.

FIG. 2 is a transverse sectional view of a width direction of a document placing table 2. FIG. 3 is a partially enlarged sectional view of a portion near a left end of the document placing table 2. FIG. 4 is a longitudinal sectional view of a depth direction of the image reading apparatus 1. In FIG. 2, a document cover 4 is indicated by broken lines, and in FIG. 3 and FIG. 4, the document cover 4 is omitted.

The image reading apparatus 1 may be provided as an image reader for reading documents, for example, for a copier, a facsimile, a scanner, a multi-function device (MFD), and the like.

As shown in FIG. 1 to FIG. 4, with the image reading apparatus 1, the document cover 4 is openably and closeably mounted onto a document placing table 2 via hinges at a back side (to the rear of the paper surface). The document cover 4 includes an ADF (Auto Document Feeder) which is a document transferring system 3. The document placing table 2 functions as an FBS (Flatbed Scanner).

Figure 1:
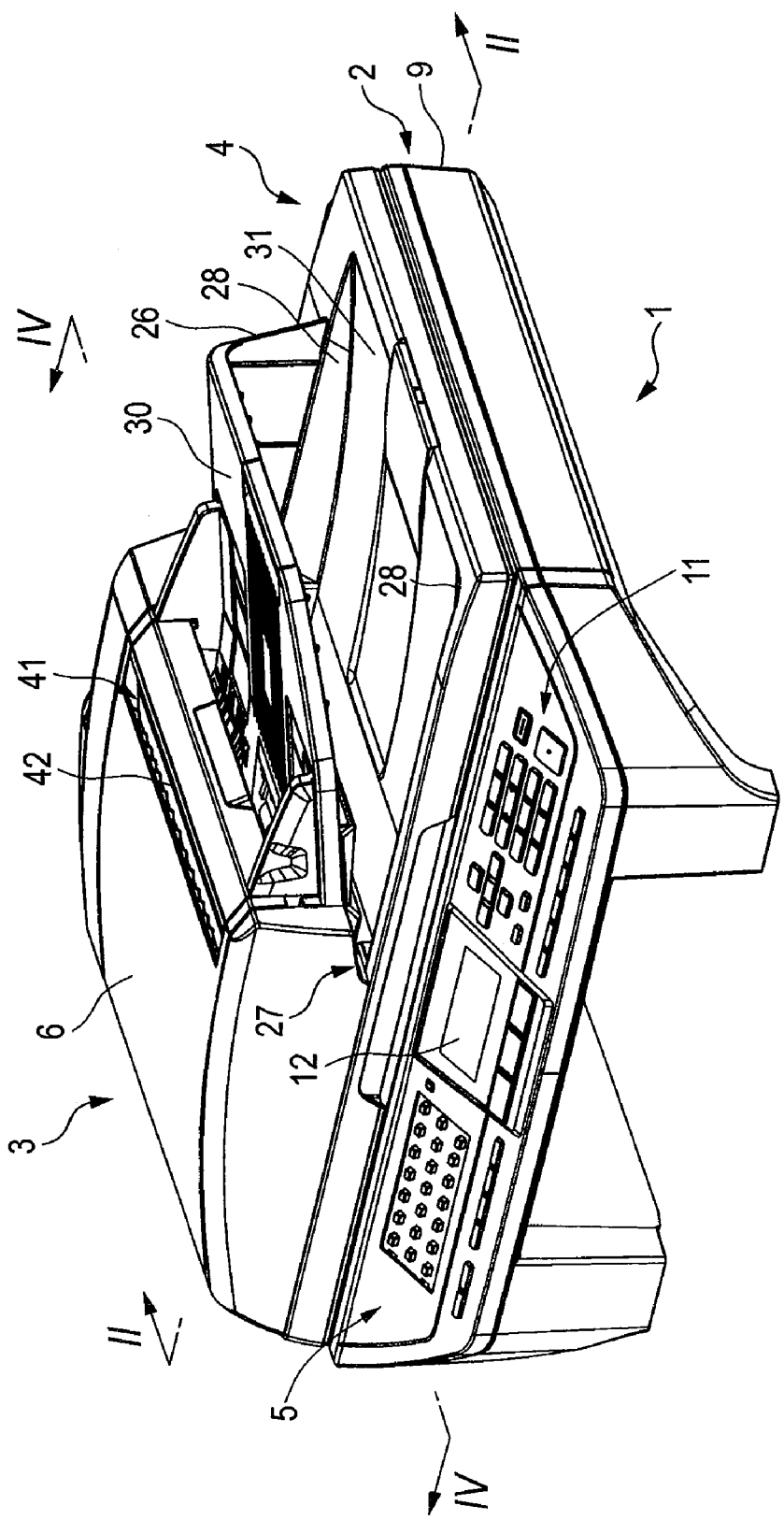
FIG. 1 is an exemplary perspective view of an external arrangement of an image reading apparatus 1 according to an illustrative aspect.

As shown in FIG. 1, an operating panel 5 is disposed at a front side of the document placing table 2. The operating panel 5 includes various operating keys 11 and a liquid crystal display unit 12. A user uses the operating panel 5 to input predetermined commands. For example, input of "Start," which indicates starting of document scanning, or "Stop," which indicates stopping or interruption of scanning, is performed using the operating keys 11. The image reading apparatus 1 receives the predetermined inputs and performs operations depending on the inputs. The image reading apparatus 1 is also connected to a computer via LAN and operates depending on input signals transmitted from the computer via a printer driver or scanner driver, etc.

As shown in FIG. 2 to FIG. 4, the document placing table 2 has a glass 20 (serving as a first plate) and a glass 21 (serving as a second plate) disposed on an upper surface that opposes the document cover 4. When the document cover 4 is opened with respect to the document placing table 2, the glass 20 and 21 become exposed as upper surfaces of the document placing table 2. As shown in FIG. 1 and FIG. 2, when the document cover 4 is closed with respect to the document placing table 2, the entire upper surface of the document placing table 2, including the glasses 20 and 21, is covered. An elastic member 8 (see FIG. 8), for pressing a document (stationary document) onto the glass 20, is provided on a lower surface of the document cover 4. An image reader 22 is disposed in the document placing table 2.

The document placing table 2 has a casing 9 of a substantially rectangular shape. As shown in FIG. 2 and FIG. 4, the casing 9 is configured by an upper cover 9A being fitted to a lower frame 9B. The upper cover 9A has an opening 10 formed on an upper surface of itself, and the glasses 20 and 21 are mounted on the upper cover 9A to be exposed from the opening 10.

Figure 6:
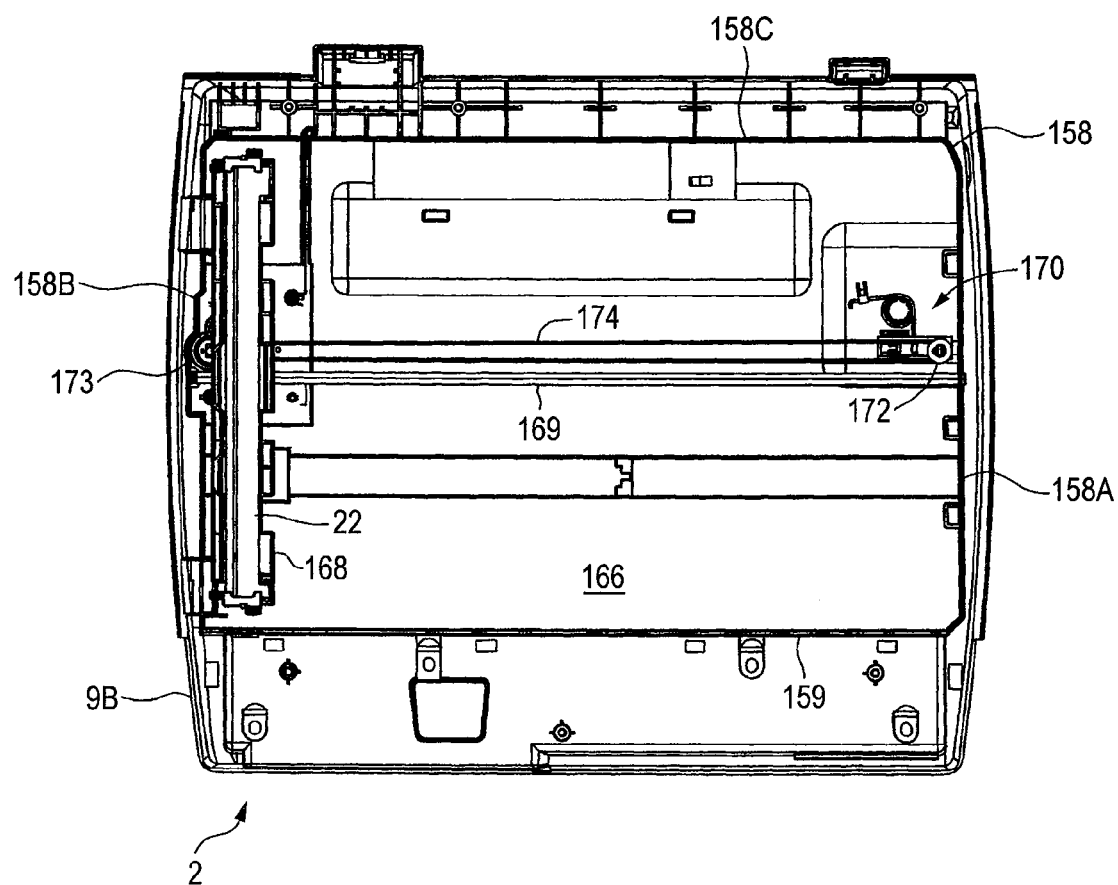
FIG. 6 is an exemplary plan view of an internal arrangement of the document placing table 2.

FIG. 6 is a plan view of an internal arrangement of the document placing table 2. In FIG. 6, the upper cover 9A of the casing 9 is omitted. As shown in FIG. 6, the lower frame 9B of the document placing table 2 is formed to a box-like shape that is open at its upper side. The lower frame 9B includes a base portion 166 as a bottom plate of the lower frame 9B, a side wall 158, which is erected from a periphery of the base portion 166, and a partitioning plate 159, and these are formed integrally. The partitioning plate 159 partitions a region, in which the image reader 22 is disposed, and a region, in which a circuit board of the operating panel 5 (see FIG. 4), etc., are disposed. The partitioning plate 159 is disposed at a front side of the apparatus in the lower frame 9B as shown in FIG. 6. Meanwhile, the side wall 158 has a substantially angular U-like shape in plan view and includes a right side wall 158A extending in the depth direction of the apparatus from a right end of the partitioning plate 159, a left side wall 158B extending in the depth direction of the apparatus from a left end of the partitioning plate 159, and a back side wall 158C at the back side of the apparatus.

In the present illustrative aspect, the glass 20 is aligned to the right side as viewed from the front of the apparatus, and the glass 21 is aligned to the left side as viewed from the front of the apparatus. A positioning member 23 (serving as a partitioning member), to be described later, is interposed between the glass 20 and the glass 21.

Both ends in the apparatus depth direction and a right end of the glass 20 are supported by the right side wall 158A, the back side wall 158C, and the partitioning plate 159. That is, the glass 20 is supported only at three sides to the right, and a left end at the glass 21 side is not supported at all. Both ends in the apparatus depth direction and a right end of the glass 21 are supported by the right side wall 158A, the back side wall 158C, and the partitioning plate 159. That is, the glass 21 is supported only at three sides, and a left side of the glass 20 side is not supported at all. While being supported thus, the glass 20 and the glass 21 are fixed by the upper cover 9A being fitted onto the lower frame 9B. The glass 20 is thereby disposed so as to be aligned to the right and the glass 21 is disposed so as to be aligned to the left on the upper surface of the document placing table 2 and these glasses are thus disposed so as to be aligned side-by-side to the left and right. Although the casing 9 is provided with claws and grooves that engage the upper cover 9A and the lower frame 9B, bosses for screwing various members, penetrating holes, etc., for electrical wiring, etc., because these are designed as suited according to the illustrative aspect of the document placing table 2, a detailed description thereof will be omitted in the present Specification.

Although with the present illustrative aspect, a structure, in which the glass 20 and the glass 21 are supported by the side plate 158 and the partitioning plate 159 of the lower frame 9B, the present invention is not restricted to such a supporting structure. The present invention is favorable for an image reading apparatus having a supporting structure, in which the edge of the glass 20 at the glass 21 side is not supported, that is, a supporting structure, with which when a load is applied to the glass 20, the edge of the glass 20 at the glass 21 side is deformed downward.

A document is placed on the glass 20 when the image reading apparatus 1 is used as an FBS. The glass 20 has dimensions enabling support of a document of the maximum size. With the image reading apparatus 1, the glass 20 has dimensions enabling placement of a document of A4 size or legal size. The glass 20 serves as a transparent glass plate. A plate member formed of another transparent material, such as a transparent resin, may be used instead of the glass 20. The glass 20 includes a reading region (referred to hereinafter as "stationary document reading region") for reading an image of a document (referred to hereinafter as "stationary document") that is placed on the glass 20. In other words, the exposed surface of the glass 20 serves as the stationary document reading region. The stationary document placed on the glass 20 is fixed onto the glass 20 by the closing of the document cover 4. In this state, the image reader 22 is moved along the glass 20 from a predetermined positioned, so-called "home position", and scans the surface of the stationary document to perform image reading of the document by the FBS. In the present illustrative aspect, a portion substantially below the glass 21 is set as the home position of the image reader 22. The home position is not restricted to the portion substantially below the glass 21. The home position may be set to any position as long as the image reader 22 is controlled to pass across the edge of the glass 20 when a stationary document is scanned.

The glass 21 includes a reading region (referred to hereinafter as "moving document reading region") in cases of scanning an image of a document (referred to hereinafter as "moving document") that is transferred by the ADF 3. In other words, the glass 21 serves as the moving document reading region. The glass 21 is also constituted of a transparent glass plate. A plate member formed of another transparent material, such as a transparent resin, may be used in place of the glass 21. The glass 21 is formed to an oblong shape that is long in the depth direction of the image reading apparatus 1 and narrow in the width direction of the image reading apparatus 1. The length in the depth direction of the glass 21 corresponds to the length in the depth direction of the image reader 22.

As shown in FIG. 3, the positioning member 23 is disposed between the glass 20 and the glass 21. The positioning member 23 is used as a positioning reference in the placing of a document of the glass 20. Marks indicating placement positions are thus made on the upper surface of the positioning member 23 depending on such document sizes as A4 size, B5 size, etc. Also, on an upper surface side of the positioning member 23 is formed a guide surface 24 that scoopingly guides a moving document, passing across the glass 21 from an edge 16 and in the direction of the central side of the document placing table 2 (direction indicated by an arrow 17), to a document transfer path 32 (see FIG. 8) in the interior of the ADF 3.

The positioning member 23 is an elongate, flat, plate-like member that is formed to an oblong shape that is long in the depth direction of the image reading apparatus 1 and narrow in the width direction of the image reading apparatus 1. This positioning member 23 extends in the depth direction of the image reading apparatus 1 on the upper surfaces of the glass 20 and the glass 21. The glass 20 and the glass 21 are partitioned by the positioning member 23. Both ends of the positioning member 23 in the depth direction of the apparatus 1 are supported by top portions of the back side surface 158C and the partitioning plate 159 of the lower frame 9B and the positioning member 23 is thereby held on the upper surface of the document placing table 2.

As shown in FIG. 3, the positioning member 23 is fitted in a gap between the glass 20 and the glass 21. A fitted portion 25 fitted in this gap is designed to have dimensions such that a lower end portion thereof is coplanar to the lower surfaces of the glasses 20 and 21. Even when the positioning member 23 is interposed between the glass 20 and the glass 21, the lower surfaces of the glass 20, the positioning member 23, and the glass 21 form a flat, coplanar surface. The image reader 22 can thus move smoothly between the glass 20 and the glass 21 under a normal state. When the glass 20 is pressed downward or when a heavy object is placed as a document on the glass 20, the glass 20 deforms downward and a step 18 (portion indicated by alternate long and two short dashes line in FIG. 3) that protrudes downward from a lower end of the fitted portion 25 of the positioning member 23 is formed.

Figure 5:
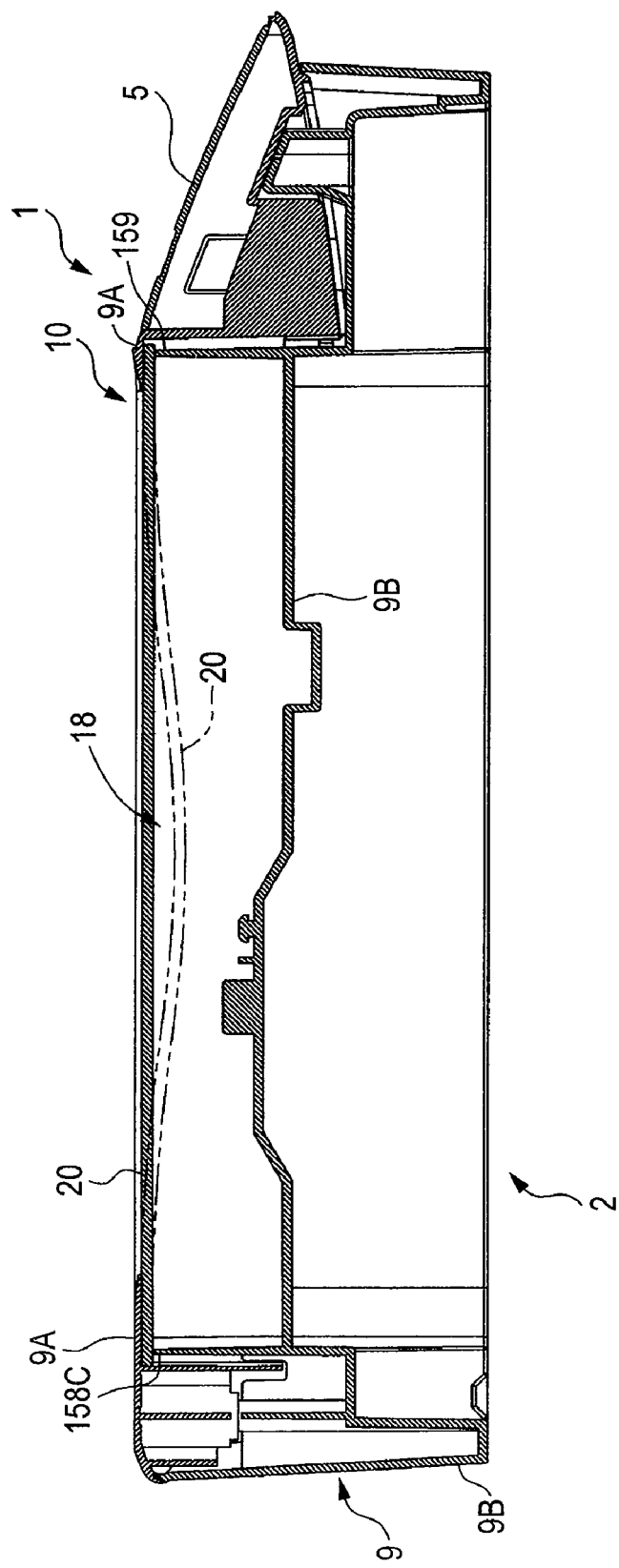
FIG. 5 is an exemplary sectional view taken on section line V-V of FIG. 3.

FIG. 5 shows a state in which the end of the glass 20 is deformed is indicated by alternate long and two short dashes line. The actual step 18 is not as large as shown in FIG. 5, and the step 18 is illustrated in an exaggerated manner in FIG. 5. As shown in FIG. 5, in the glass 20, the step 18 is formed near a center in the depth direction of the apparatus and at an end at the side of the boundary with the glass 21 (the left end in FIG. 2 and FIG. 3). Although such a step 18 causes an obstruction of smooth movement of the image reader 22, in the present illustrative aspect, by a guiding unit, which is provided on the image reader 22 and will be described below. The image reader 22 is guided smoothly to the lower surface of the glass 20 or the glass 21 without becoming damaged or falling off. This guiding unit will be described in detail later.

Figure 7:
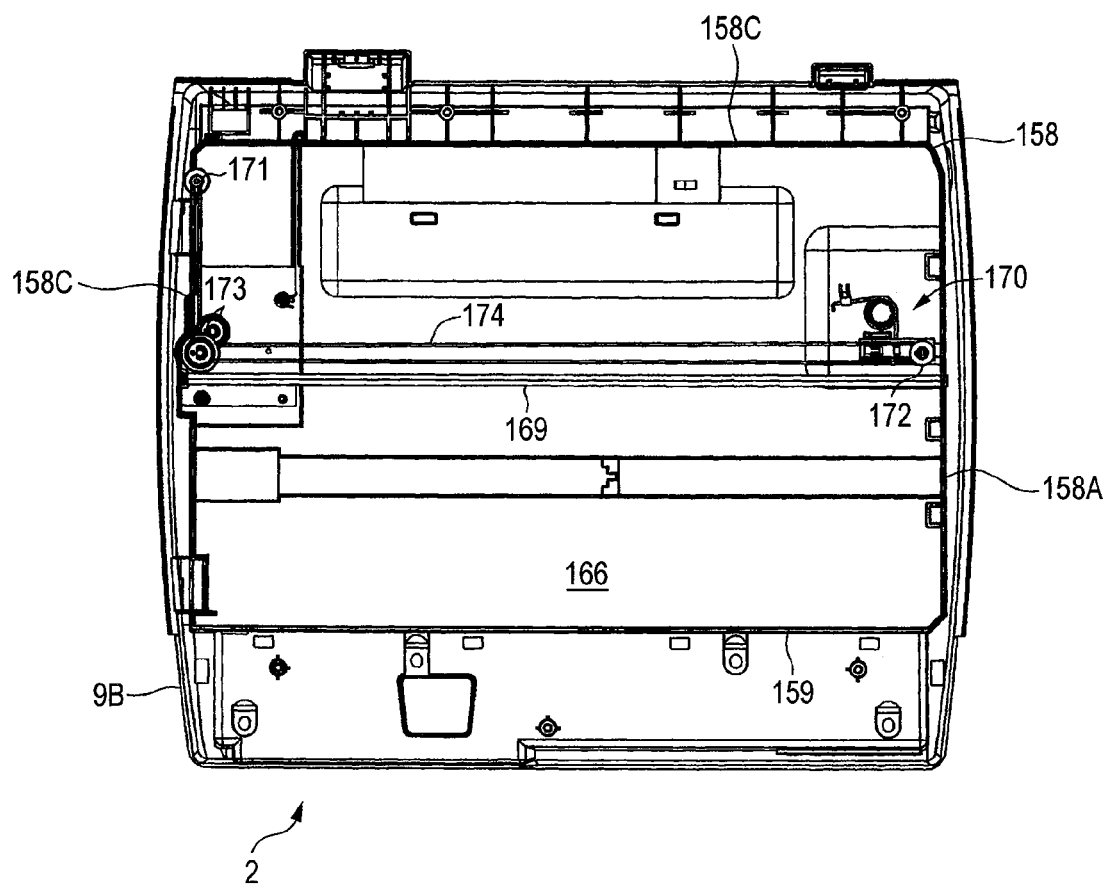
FIG. 7 is an exemplary plan view of the document placing table 2 and shows a general arrangement of a belt drive mechanism 170.

An internal arrangement of the image reading apparatus 1 shall now be described with reference to FIG. 4, FIG. 6, and FIG. 7. FIG. 7 is a plan view of the document placing table 2 and shows a general arrangement of a belt drive mechanism 170.

As shown in FIG. 4 and FIG. 6, the image reader 22 is disposed inside the casing 9 of the document placing table 2. The image reader 22 is an image sensor, with which at least an LED, serving as a light source, a light receiving element, and a converging lens 63 (see FIG. 9), guiding reflected light of light emitted from the LED and illuminated onto a document through the glass 20 or 21, are incorporated in a housing 61 (see FIG. 9). This image reader 22 is mounted on a carriage 168, is arranged to be capable of being reciprocated below the glasses 20 and 21 by the belt drive mechanism 170, which is a scanning mechanism, and reciprocates in parallel to the glass 20 and 21 upon receiving a driving force of a carriage motor. The light receiving element that receives the reflected light during this reciprocation converts electrical signals depending on intensities of the reflected light and outputs the electrical signals as image data. As will be described in detail below, by the carriage 168 being fitted onto a guide shaft 169, spanned across a width direction of casing 9, the image reader 22 is supported in a manner enabling movement in a direction orthogonal to a longitudinal direction of the carriage 168 below the glass 20. In the present illustrative aspect, a Contact Image Sensor is employed as the image reader 22. By employment of the CIS, the mechanism of support by the carriage 168 is made compact and lightweight, and compactness and thinness of the image reading apparatus 1 are realized. Obviously, the image reader 22 is not restricted to the CIS, and for example, a CCD (Charge Coupled Device) image sensor of a reducing optical system, etc., or any one of other various image sensors may be applied as the image reader 22.

As shown in FIG. 6 and FIG. 7, the belt drive mechanism 170, including the guide shaft 169, etc., is disposed below the image reader 22, that is, below the carriage 168. As shown in this figure, the guide shaft 169 is spanned in the width direction (left/right direction in FIG. 7) and across the entire width of the casing 9 and is disposed so as to be parallel to the glasses 20 and 21.

As shown in FIG. 7, the belt drive mechanism 170 includes a driving pulley 171, a driven pulley 172, a timing belt 174, which is wound across the pulleys, and an unillustrated motor. The timing belt 174 is an endless belt having teeth formed on its inner side. The motor is connected to a shaft of the driving pulley 171. By the motor rotating the driving pulley 171, the timing belt 174 receives the rotation and undergoes revolving motion.

The driving pulley 171 is disposed at a left inner portion of the casing 9 as viewed from the front of the apparatus. The timing belt 174 that is wound around the driving pulley 171 is extended to the front side of the casing 9 and is wound around an intermediate pulley 173, disposed in front of the guide shaft 169. The timing belt 174 is then bent at substantially a right angle, extended along the guide shaft 169 to the right end of the casing 9, and wound around the driven pulley 172, disposed near the right end of the casing 9. That is, as shown in FIG. 7, the timing belt 174 is spanned in a substantially L-like manner across the driving pulley 171 and the driven pulley 172 with the intermediate pulley 73 in between. The portion of the timing belt 174 from the driven pulley 172 to the intermediate pulley 173, that is, the portion extended along the guide shaft 169 is clamped by a connecting portion 175 (see FIG. 4) of the carriage 168. The timing belt 174 and the carriage 168 are connected thereby. Needless to say, a belt with ends, with which both ends of the belt are fixed to the carriage 168, may be applied in place of the timing belt 174.

Figure 8:
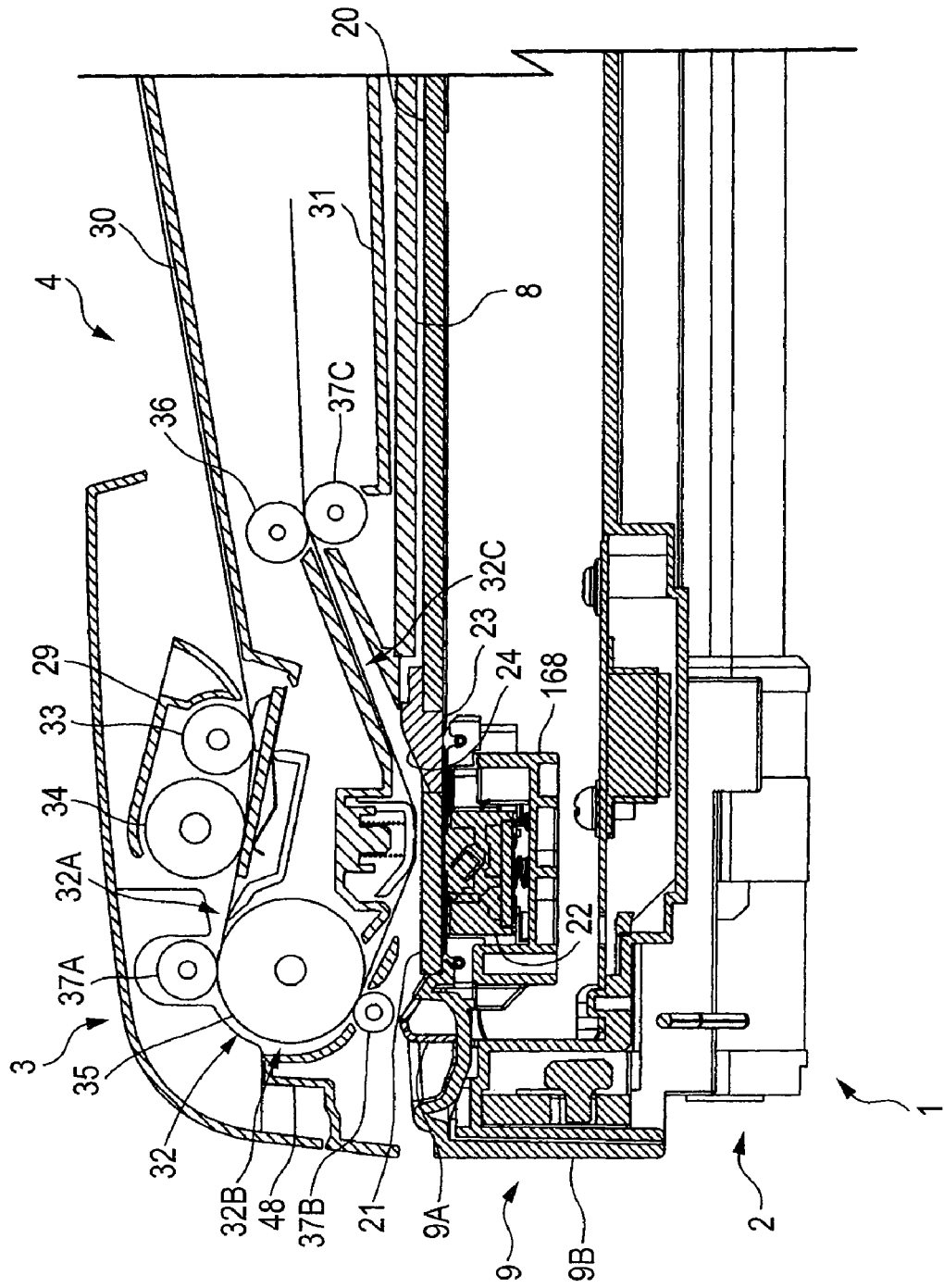
FIG. 8 is an exemplary sectional view of an internal arrangement of an ADF 3.

Arrangements of the document cover 4 and the ADF 3 shall now be described with reference to FIG. 1 and FIG. 8. FIG. 8 is a sectional view of the internal arrangement of the ADF 3. As shown in FIG. 1 and FIG. 8, in the document cover 4, a paper feeding tray 30 and a paper ejecting tray 31 are disposed in two vertical stages, with the paper feeding tray 30 being disposed at the upper side. The document cover 4 is equipped with the ADF 3 that transfers documents continuously from the paper feeding tray 30 to the paper ejecting tray 31. In the process of transferring by the ADF 3, an image of a moving document that moves across the glass 21 is read by the image reader 22 standing by below the glass 21.

Documents to be transferred by the ADF 3 are placed on the paper feeding tray 30. A plurality of sheets of documents are placed on the paper feeding tray 30 in a layered state with a first surface of each being faced upward and a front end in a paper feeding direction being inserted in the document transfer path 32. As show in FIG. 1, a protective wall 26 is formed by an apparatus back side of the paper feeding tray 30 being curved downward. A lower end of the protective wall 26 is connected to an upper surface of the document cover 4. The protective wall 26 prevents a document on the paper ejecting tray 31 from falling off when the document cover 4 is opened with respect to the document placing table 2. Below an apparatus front side of the paper feeding tray 30, a notch 27 is formed in a portion of a housing of the ADF 3. This notch 27 improves the ability to visually recognize a document, ejected onto the paper ejecting tray 31, from the front side of the apparatus. In particular, although a document of small size is difficult to recognize visually from the paper feeding tray 30, because a space between the paper feeding tray 30 and the paper ejecting tray 31 is enlarged by the notch 27, the ability to visually recognize documents of small size is improved.

The paper ejecting tray 31 is disposed at the lower side of the paper feeding tray 30 at a position separated from the paper feeding tray 30 in the vertical direction and is formed integral to the upper surface of the document cover 4. A document, which is ejected from the ADF 3 after being subject to image reading, is held in a layered manner with the first surface down on the paper ejecting tray 31 and being separated from documents on the paper feeding tray 30. Both side portions 28, which are an apparatus front side and apparatus back side, of the paper ejecting tray 31 are inclined surfaces that are inclined upward to the respective sides. Because by the provision of both side portions 28, a document ejected onto the paper ejecting tray 31 can be taken out by sliding and drawing the document out along the inclined surfaces of both side portions 28 while pressing the document from above, the taking out of documents from the paper ejecting tray 31 is facilitated.

As shown in FIG. 8, in the interior of the ADF 3, the document transfer path 32 of a substantially laterally facing U-like shape in longitudinal sectional view is formed so as to connect the paper feeding tray 30 and the paper ejecting tray 31 via the reading position on the glass 21. The document transfer path 32 is formed in a continuous manner as a passage of predetermined width that enables passage of a document from members constituting the main ADF unit and guide plates, guide ribs, etc. By the paper feeding tray 30 and the paper ejecting tray 31 thus being disposed in two vertical stages and the document transfer path 32 of the substantially laterally facing U-like shape in longitudinal sectional view being formed so as to connect the trays, the ADF 3 can be made narrow in width and compact in size.

The document transfer path 32, with the laterally facing U-like shape in longitudinal sectional view, extends from the paper feeding tray 30 to one end side (left side in FIG. 8) of the document cover 4, then curves downward in a reversing manner to reach the reading position on the glass 21, and then extends from the reading position toward the paper ejecting tray 31. The document transfer path 32 can largely be divided into the three portions of an upper portion 32A and a lower portion 32C that constitute straight portions at two vertical stages of the laterally facing U-like shape and a curving portion 32B that is curved so as to make the upper portion 32A and the lower portion 32C continuous.

A document transfer system for transferring documents from the paper feeding tray 30 to the paper ejecting tray 31 is disposed in the document transfer path 32. In detail, the document transfer system is constituted of a pickup roller 33, a separating roller 34, a transfer roller 35, a paper ejecting roller 36, pinch rollers 37A and 37B, which are put in press-contact with the transfer roller 35, and a pinch roller 37C, which is put in press contact with the paper ejecting roller 36, and these components are disposed in the document transfer path 32 as shown in FIG. 8. A driving force from an unillustrated motor is transmitted to each of the rollers constituting the document transfer system.

As shown in FIG. 8, the pickup roller 33 and the separating roller 34, which are formed to be substantially the same in diameter, are disposed near an upstream-most portion of the document transfer path 32. The pickup roller 33 is disposed rotatably at a front end of an arm 29, a base end side of which is axially supported by a shaft that axially supports the separating roller 34. The separating roller 34 is rotatably disposed at a position separated from the pickup roller 33 in the paper feeding direction so as to contact an opposing surface of the document transfer path 32. The pickup roller 33 and the separating roller 34 are rotated at the same peripheral speed by transmission of a driving force from an unillustrated motor. The arm 29 is also moved vertically by transmission of the driving force from the motor.

The transfer roller 35 is disposed at the curved portion 32B of the document transfer path 32. To be more detailed, the transfer roller 35 is disposed at an inner side of the curved portion 32B. The transfer roller 35 is also driven to rotate by transmission of a driving force from an unillustrated motor. At a position that opposes an upper roller surface of the transfer roller 35 is disposed the pinch roller 37A that is put in press-contact with the roller surface. At a position that opposes a lower roller surface of the transfer roller 35 is disposed the pinch roller 37B that is put in press-contact with the roller surface. Each of the pinch rollers 37A and 37B is press-contacted with the roller surface of the transfer roller 35 by a shaft thereof being elastically urged by a spring or other elastic member. When the transfer roller 35 rotates with the pinch rollers 37A and 37B being put in press-contact with the transfer roller 35, the pinch rollers 37A and 37B are driven thereby and rotate as well. A document thus receives the rotating force of the transfer roller 35 while being sandwiched by the pinch rollers 37A and 37B and the transfer roller 35 and is transferred through the document transfer path 32. Although in the present illustrative aspect, the two pinch rollers 3A and 37B are arranged to be in press-contact with the upper side and the lower side, respectively, of the single transfer roller 35, the number, positions, roller widths, etc., of the respective rollers may obviously be changed as suited. Also, an arrangement, in which an elongate transfer roller that extends across the entirety of a depth direction of the ADF 3 is disposed, or an arrangement, in which a plurality of transfer rollers are disposed coaxially in the depth direction of the ADF 3, may be employed instead.

The paper ejecting roller 36 is disposed near a downstream-most portion of the document transfer path 32, and as with the transfer roller 35, is driven to rotate by transmission of a driving force from an unillustrated motor. The pinch roller 37C is disposed at a position opposing the paper ejecting roller 36. The pinch roller 37C is also put in press-contact with the paper ejecting roller 36 by being elastically urged by a spring.

The ADF 3 is provided with an ADF cover 6 that is rotatably supported on a main ADF unit 48. The ADF cover 6 is formed so as to cover the entirety of the ADF 3, including the paper feeding roller 33 and the separating roller 34 and is arranged to be capable of being opened and closed with respect to the ADF 3. By the opening of the ADF cover 6, a portion of the document transfer path 32 inside the ADF 3 becomes exposed. Treatment of jamming and other maintenance work are thereby enabled.

In performing image reading of a document using such an ADF 3, the document is transferred as follows. The document that is fed out from the paper feeding tray 30 is transferred by the transfer roller 35 to the upper portion 32A and the curved portion 32B of the document transfer path 32. When a front end in the transfer direction of the document reaches the glass 21, the document is exposed from the ADF 3 and is transferred across the glass 21 in the direction of an arrow 45 (see FIG. 8) (the right direction in FIG. 8). An image of the document moving across the glass 21 is read by the image reader 22 that stands by below the glass 21. The front end in the transfer direction of the document moving across the glass 21 then contacts the guide surface 24 of the positioning member 23 and the transfer direction of the document is thereby deformed incliningly upward. The document is thus guided to the lower portion 32C of the document transfer path 32. The document that has entered the lower portion 32C is transferred toward the paper ejecting tray 31 and is ejected onto the paper ejecting tray 31 by the paper ejecting roller 36.

Although in the present illustrative aspect, the document transfer path 32 is made to have the curved portion 32B, for example, the document transfer path 32 may instead be formed to be substantially straight from the paper feeding tray 30 to the reading position on the glass 21 and to the paper ejecting tray 31.

With reference to FIG. 9 to FIG. 14, arrangements of the image reader 22 and the carriage 168 shall now be described along with the structure of support of the image reader 22 by the carriage 168.

Figure 9:
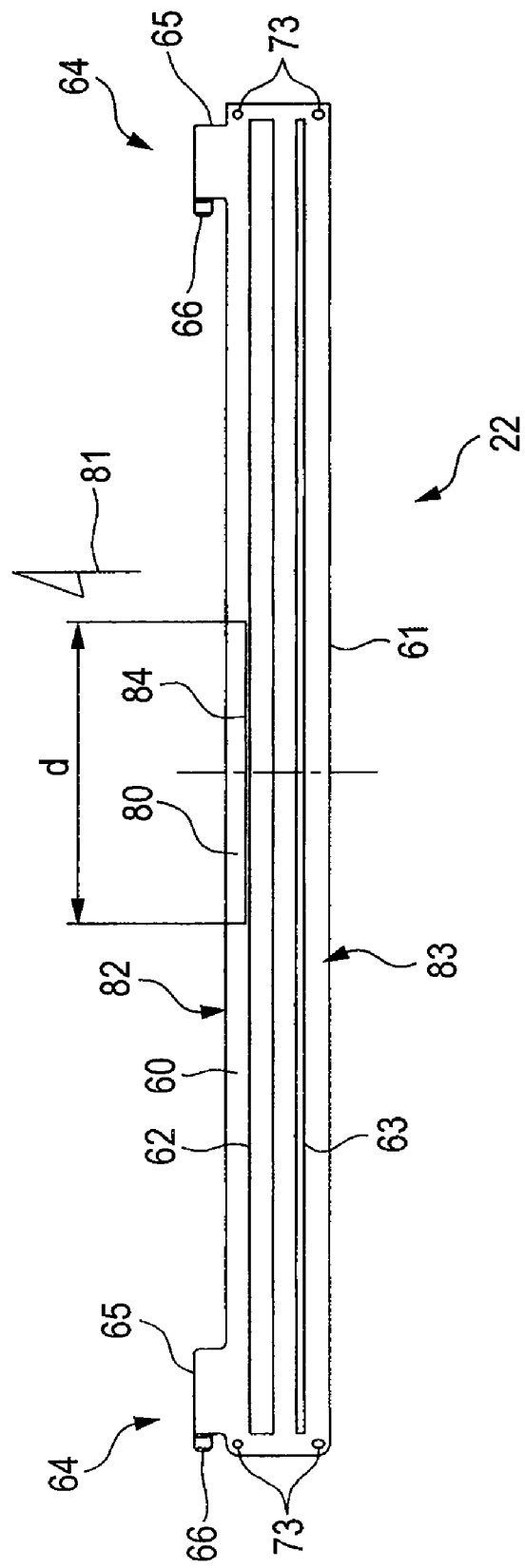
FIG. 9 is an exemplary plan view of an arrangement of an image reader 22.

FIG. 9 is a plan view of the arrangement of the image reader 22. As shown in FIG. 9, the image reader 22 includes the housing 61, with which an upper surface 60 that situates in a place relative to the glasses 20 and 21. The image reader 22 is an elongate, rectangular flat surface in plan view and the overall shape of which is an elongate rectangular parallelepiped shape. On the upper surface 60 of the housing 61, a light guide 62, which guides light from an LED (light source) incorporated in the housing 61, is disposed in a main scanning direction. By this light guide 62, the light from the LED is emitted along the main scanning direction. Also, on the upper surface 60 of the housing 61, a plurality of converging lenses 63 are disposed in a single row, two or three rows in the main scanning direction of the housing 61.

In the interior of the housing 61, a plurality of light receiving elements are aligned immediately below the converging lenses and in the same direction as the converging lenses 63. The plurality of light receiving elements are aligned in a straight row in the main scanning direction of the housing 61 of the image reader 22. Light emitted from the LED is illuminated onto a document on the glass 20 or 21 and reflected light from the document is converged by the converging lenses 63 onto the light receiving elements. The light receiving elements are so-called photoelectric conversion elements that output electrical signals depending on intensities of the reflected light and output electrical signals depending on reflected light intensities. The main scanning direction of the housing 61 of the image reader 22 is the depth direction of the image reading apparatus 1. The length in the main scan direction, that is, the length in the longitudinal direction of the housing 61 of the image reader 22 is a length corresponding to a document of the maximum size readable by the image reader 22. The image reader 22 performs scanning with the main scanning direction as a scanning line and outputs electrical signals depending on each scanning line. With the present illustrative aspect, because a letter-size document can be placed on the glass 20, the scanning line of the image reader 22 corresponds to the letter-size width.

The housing 61 of the image reader 22 is provided with fitting portions 64. The fitting portions 64 are for performing positioning, with respect to the carriage 168, in a direction orthogonal to the longitudinal direction of the image reader 22. Each fitting portion 64 is constituted of a base 65, which protrudes from one end in a lateral direction of the housing of the image reader 22, and a shaft 66, which extends in the longitudinal direction from the base 65. The shaft 66 fits in a bearing 70 of the carriage 168 to be described below and positioning of the image reader 22 in the lateral direction is accomplished thereby.

Figure 10:
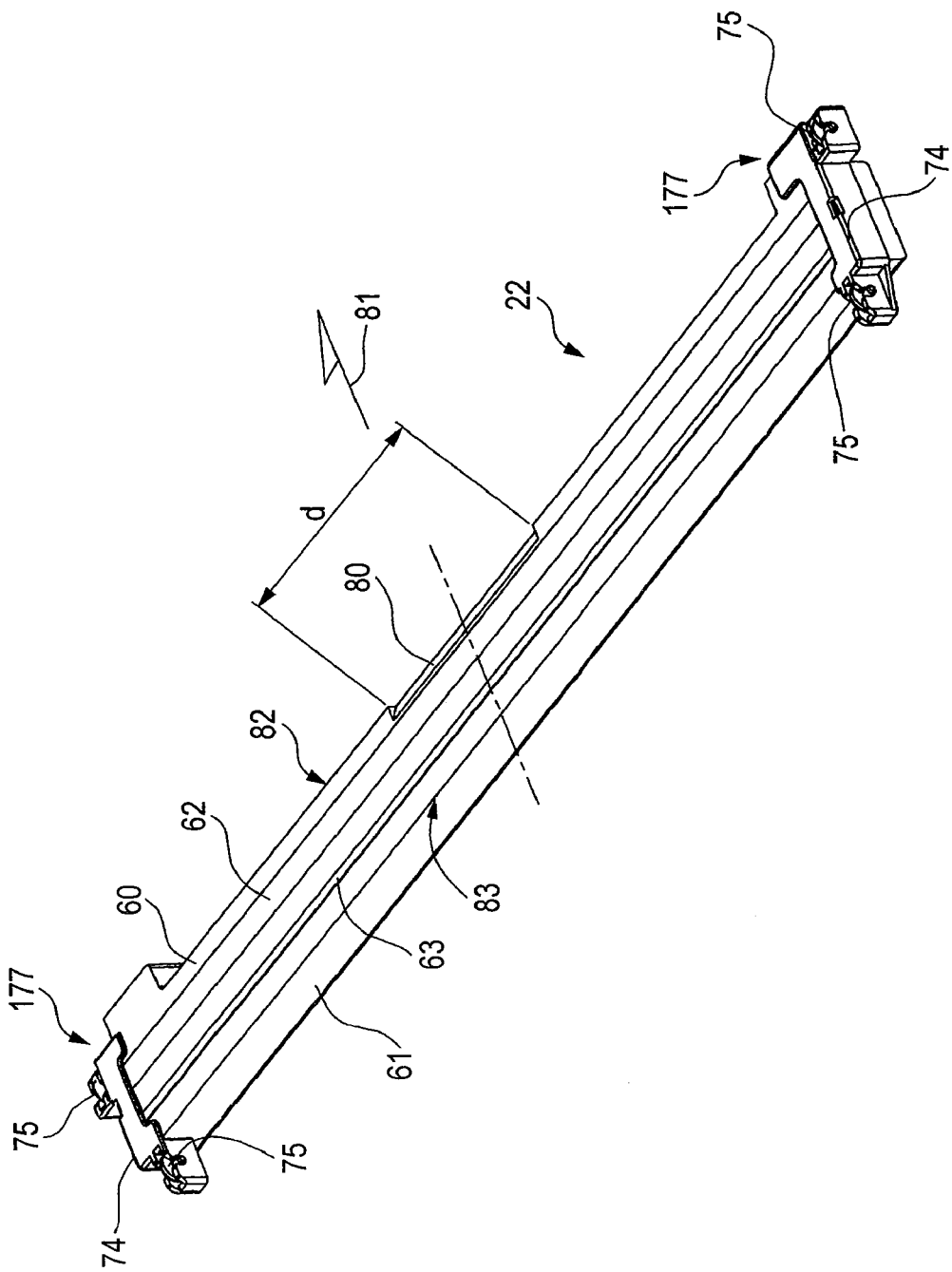
FIG. 10 is an exemplary perspective view of the image reader 22.
Figure 11:
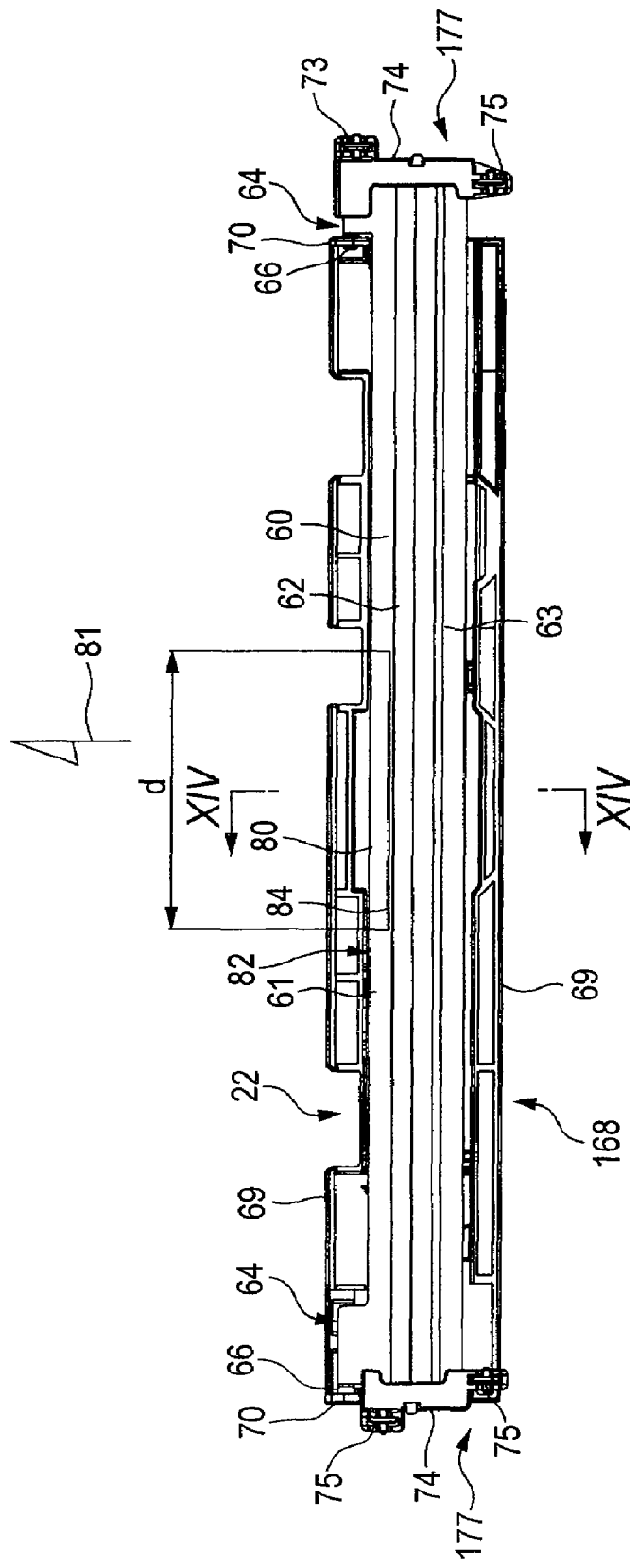
FIG. 11 is an exemplary plan view of a carriage 168 that carries the image reader 22.

FIG. 10 is a perspective view of the image reader 22, and FIG. 11 is a plan view of the carriage 168 that carries the image reader 22. As shown in FIG. 10 and FIG. 11, roller units 177 are disposed at respective ends in the main scanning direction of the image reader 22. As shown in FIG. 9, holes 73 for positioning of the roller units 177 are formed in each of both ends of the upper surface 60 of the image reader 22. Pins protruded from bottom surfaces of the roller units 177 are fitted into the holes 73, and the roller units 177 are thereby respectively positioned at and fixed to both ends of the image reader 22 as shown in FIG. 10 and FIG. 11. With each of the roller units 177, two rollers 75, spaced apart in the lateral direction of the image reader 22, are axially supported by a frame 74 in a manner enabling rolling in the lateral direction. The respective rollers 75 protrude uniformly upward from the upper surface 60 of the image reader 22 and these rollers contact the rear surfaces of the glasses 20 and 21 to keep the upper surface 60 of the image reader 22 and the rear surfaces of the glasses 20 and 21 at a predetermined interval. By this predetermined interval, the focal length of the image reader 22 is matched to the upper surfaces (exposure surface) of the glasses 20 and 21. That is, the rollers 75 of the roller units 177 are protruded upward from the upper surface 60 to make the focal length of the image reader 22 match the upper surfaces of the glasses 20 and 21. Also, the respective rollers 75 makes the image reader 22 onto the glasses 20 and 21 move smoothly.

As shown in FIG. 9 to FIG. 13, the housing 61 has an inclined surface 80 formed at one corner in the lateral direction of the upper surface 60. The inclined surface 80 contacts the step 18 (the alternate long and two short dashes line in FIG. 3 and FIG. 5) when the image reader 22 is moved and thereby passes across the step 18 to guide the image reader 22 to the lower surface of the glass 20. The inclined surface 80 serves as the guiding unit.

The inclined surface 80 is integrally formed with the housing 61. For example, the inclined surface 80 is realized by molding the housing 61 from a synthetic resin, etc., in a mold that includes the inclined surface 80. As illustrated, the inclined surface 80 is formed on a corner portion at the front end side in a movement direction (direction of an arrow 81) when the image reader 22, which stands by at the home position below the glass 21, moves toward the glass 20. This inclined surface 80 is formed across a predetermined width d near a center in the longitudinal direction of the housing 61. In other words, the inclined surface 80 is formed at the corner portion 82 of the housing 61 that corresponds to substantially the center of the glass 20 at which the step 18 is maximized. The width d of the inclined surface 80 is determined depending on the distance of separation from the glass 20 to the upper surface 60, the size of the glass 20, and other factors that determine the magnitude of the step 18. For example, a coating agent containing a fluororesin of low friction characteristics is coated on the inclined surface 80. The inclined surface 80 is thereby improved in slidability, and when the inclined surface 80 contacts the step 18, the step 18 slides smoothly over the inclined surface 80.

Although the present illustrative aspect is an example in which the inclined surface 80 is formed integral to the housing 61, the inclined surface 80 may instead be formed on a separate member that is detachable with respect to the housing 61. For example, an arrangement, in which a groove-like fitting portion 87 is formed in the corner portion 82 of the housing 61 and the inclined surface 80 is formed on an inclined member 88, having an inserted portion 89 that is fitted into the fitting portion 87, may be considered. By the inserted portion 89 of the inclined member 88 being fitted in the fitting portion 87, the inclined member 88 is fixed to the housing 61. In this case, the inclined member 88 is preferably formed of a material of lower frictional resistance than the housing 61, such as POM (polyacetal resin) or a synthetic resin containing the above-described fluororesin, etc., to improve the slidability of the inclined surface 80. Obviously, an arrangement is also possible in which a coating agent containing a fluororesin is coated onto the above-described member formed of an inexpensive synthetic resin.

Figure 14:
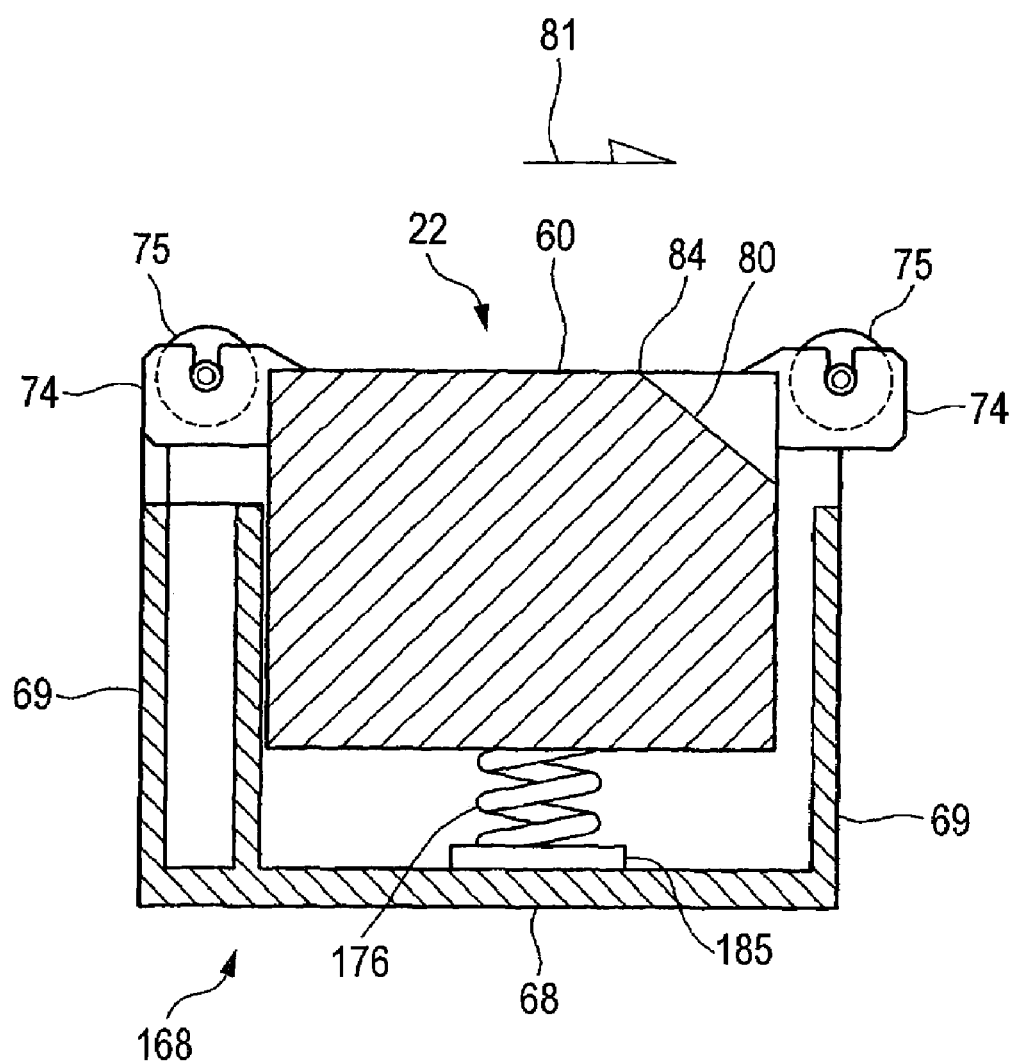
FIG. 14 is an exemplary sectional view taken on section line XIV-XIV of FIG. 11.

FIG. 14 is a sectional view taken on section line XIV-XIV of FIG. 11 and schematically shows a transverse section that includes the inclined surface 80. The inclined surface 80 is formed so as to continue in the movement direction (direction of the arrow 81) from an inclination base point 84. With distance in the movement direction from the inclination base point 84, the inclined surface 80 inclines linearly in a direction of separating from the upper surface 60 that opposes the glass 20. That is, the inclined surface 80 inclines downward so as to separate from the glass 20. Although in the present illustrative aspect, the inclined surface 80 is formed on the corner portion 82, the inclined surface 80 may be formed on the other corner portion 83 in the lateral direction of the upper surface 60. Actions and effects exhibited by providing such an inclined portion 80 on the housing 61 will be described later.

Figure 12:
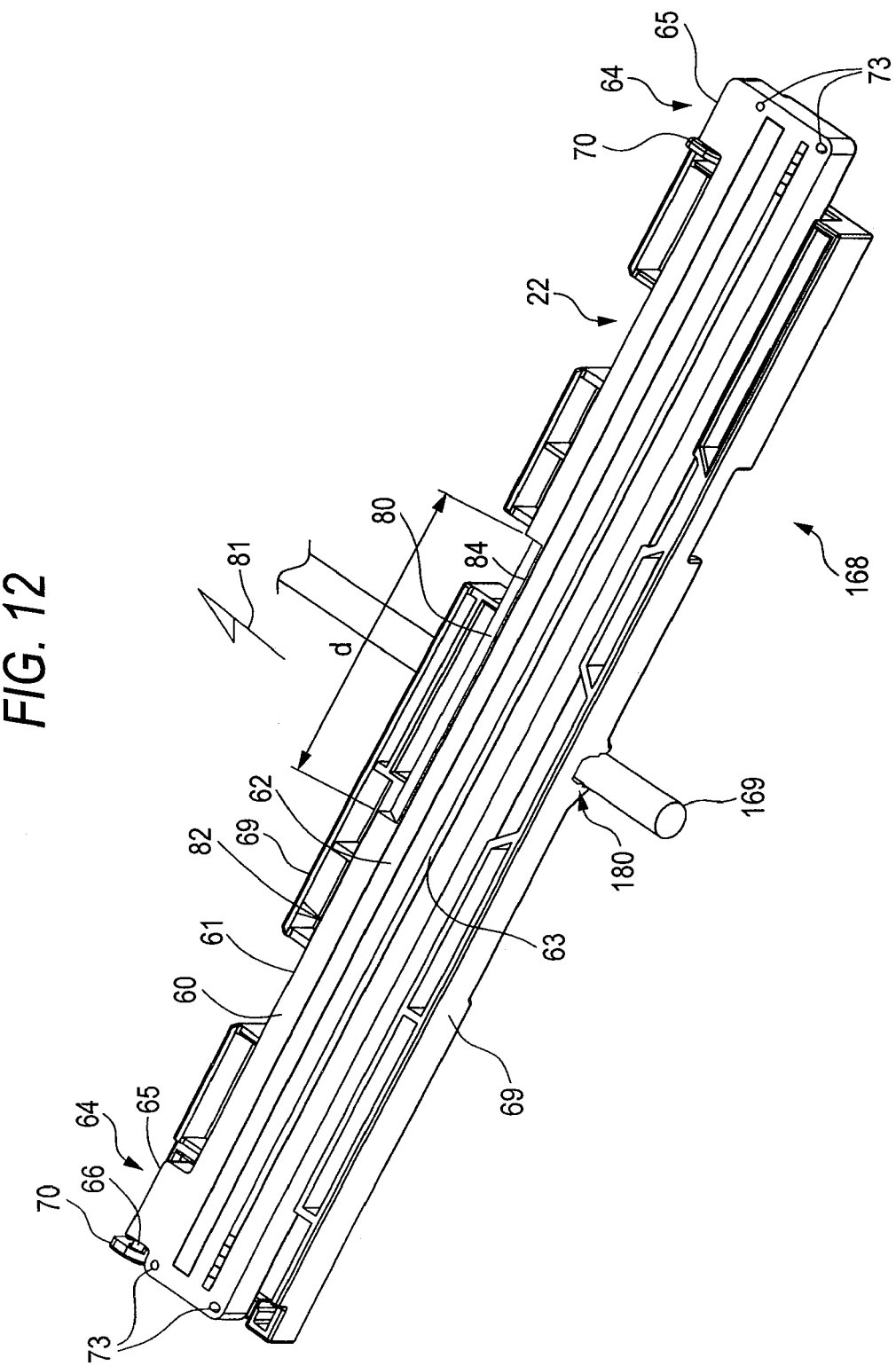
FIG. 12 is an exemplary perspective view of the image reader 22 and the carriage 168.
Figure 13:
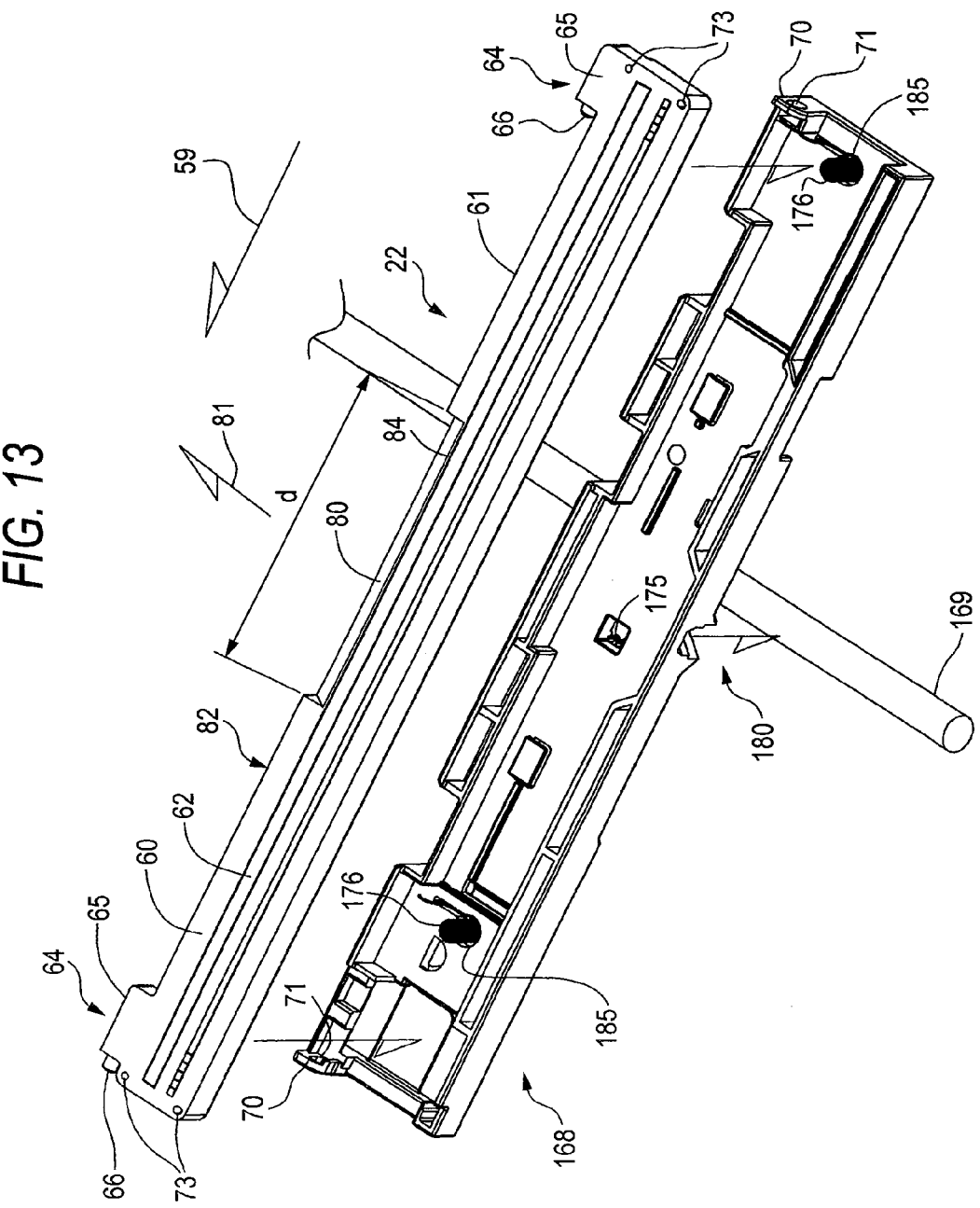
FIG. 13 is an exemplary exploded perspective view of the image reader 22 and the carriage 168.

FIG. 12 is a perspective view of the image reader 22 and the carriage 168, and FIG. 13 is an exploded perspective view of the image reader 22 and the carriage 168. The roller units 177 are omitted in FIG. 12 and FIG. 13. As shown in FIG. 11 to FIG. 13, the carriage 168 has the form of a container that carries the image reader 22 on its upper side. The carriage 168 is formed to an elongate rectangular parallelepiped shape in correspondence to the image reader 22. The carriage 168 includes a bottom portion 68 (see FIG. 14) and side walls 69, which are erected upward from respective ends in a lateral direction of the carriage 168. The side walls 69 form side surfaces of the carriage 168 in the reciprocation direction. The image reader 22 is housed in a space formed by the bottom portion 68 and the side walls 69. Side walls are not provided at both ends of the bottom portion 68 in a longitudinal direction of the carriage 168, and one end of the housing 61 of the image reader 22 protrudes from one end in the longitudinal direction of the carriage 168. An upper end of the carriage 168 is open and the upper surface 60 of the image reader 22, mounted on the carriage 168, is exposed.

As shown in FIG. 13, one of the side walls 69 is provided with bearing portions 70 that fit with the fitting portions 64 of the image reader 22. Each bearing portion 70 has a slot 71, which extends in the vertical direction, formed therein. After the shafts 66 of the fitting portions 64 are positioned at the slots 71, the image reader 22 is slid in the direction of an arrow 59 and the shafts 66 are thereby inserted through the slots 71. The image reader 22 is thereby fixed to the carriage 168. In this state, the image reader 22 is rotatable about the shafts 66 as the rotation centers and, with the shafts 66 as the centers of rising and falling, can be changed in orientation between an erected orientation and a toppled orientation with respect to the carriage 168. Moreover, because the shafts 66 are inserted through the slots 71, the shafts 66 can be slid in the vertical direction. As a result, the image reader 22 can be moved close to and away from the glasses 20 and 21 with the upper surface 60 thereof being maintained in a parallel state with respect to the rear surfaces of the glasses 20 and 21.

As shown in FIG. 12 and FIG. 13, a shaft bearing portion 180, through which the guide shaft 169 is inserted, is formed on a lower surface of the carriage 168. By the shaft bearing portion 180 and the guide shaft 169 fitting slidably, the carriage 168 is carried by the guide shaft 169 and the carriage 168 is made slidable in the axial direction of the guide shaft 169. The connecting portion 175 (see FIG. 4 and FIG. 13) is protruded downward at a side of the shaft bearing portion 180. By the connecting portion 175 grasping the timing belt 174 of the belt drive mechanism 170, the timing belt 174 and the carriage 168 are connected. A driving force is thereby transmitted from the belt drive mechanism 170 to the carriage 168 and the carriage 168 moves along the guide shaft 169.

As shown in FIG. 13, spring bearings 185 are formed at two locations at left and right portions of the inner side of the bottom surface of the carriage 168. Coil springs 176 are positioned by the spring bearings 185 and interposed between the image reader 22 and the carriage 168. By the coil springs 176, the image reader 22 is supported by the carriage 168 in a manner enabling vertical movement. Also, by the coil springs 176, the image reader 22 is elastically urged toward the glasses 20 and 21. The image reader 22, mounted on the carriage 168, is thereby put in close contact with the rear surfaces of the glasses 20 and 21 in a pressed manner.

The roller units 177 (see FIG. 11) are disposed at the respective ends of the image reader 22. The image reader 22, which is pressed toward the glasses 20 and 21 by a predetermined urging force by the coil springs 176, can move smoothly along the glasses 20 and 21 while being kept separated at a predetermined interval from the glasses 20 and 21 by the roller units 177.

As mentioned above, under a normal state, there are no steps between the glass 20 and the glass 21, and the lower surfaces of the glass 20 and the glass 21 are flat. The image reader 22 can thus move smoothly between the glass 20 and the glass 21. However, when a load is applied to the glass 20 by a thick book or magazine or other heavy document being placed on the glass 20, a portion near the center of the glass 20 becomes deformed, in particular, at the end at the glass 21 side. Due to this deflection, the step 18, such as shown in FIG. 3 and FIG. 5, is formed.

Figure 15A:
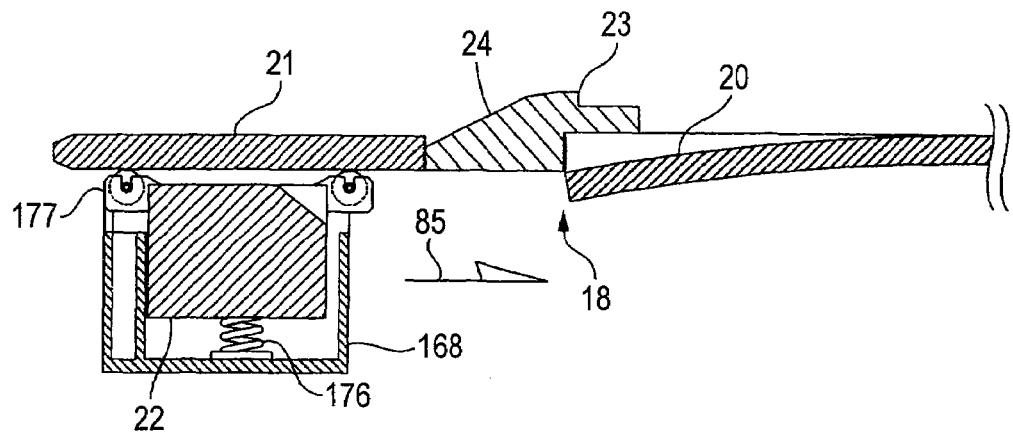
FIGS. 15A, 15B and 15C show exemplary schematic views for describing a guiding method in a movement process of the image reader 22.
Figure 15B:
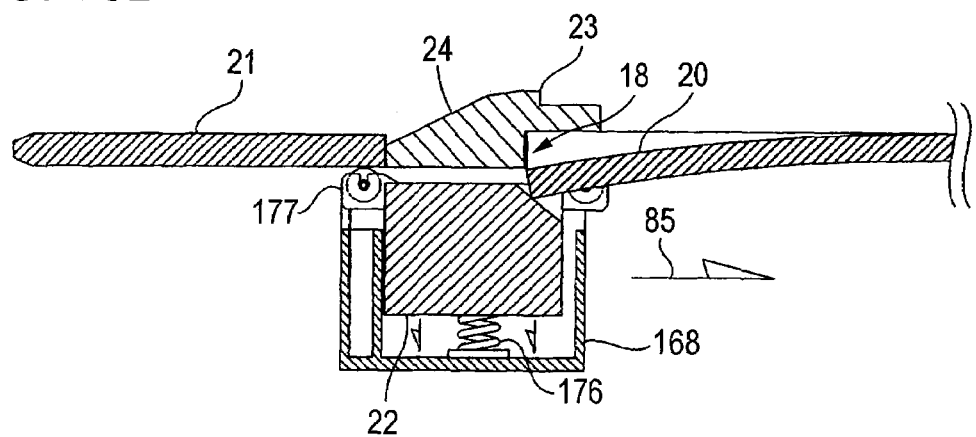
Figure 15C:
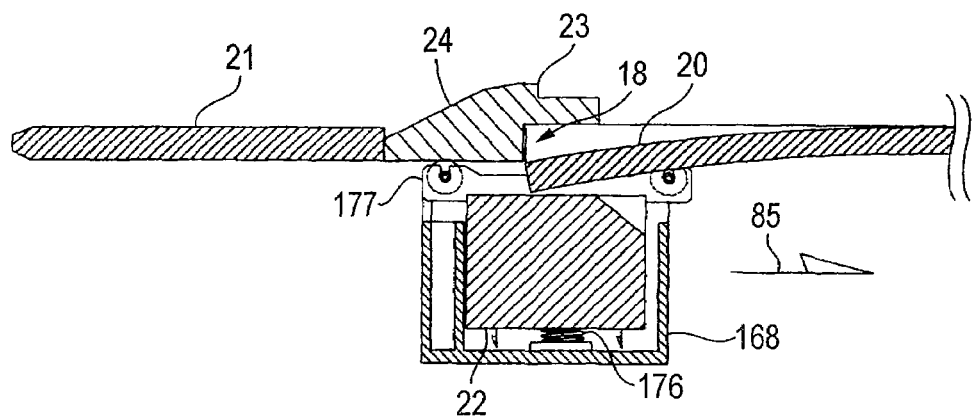
Figure 16:
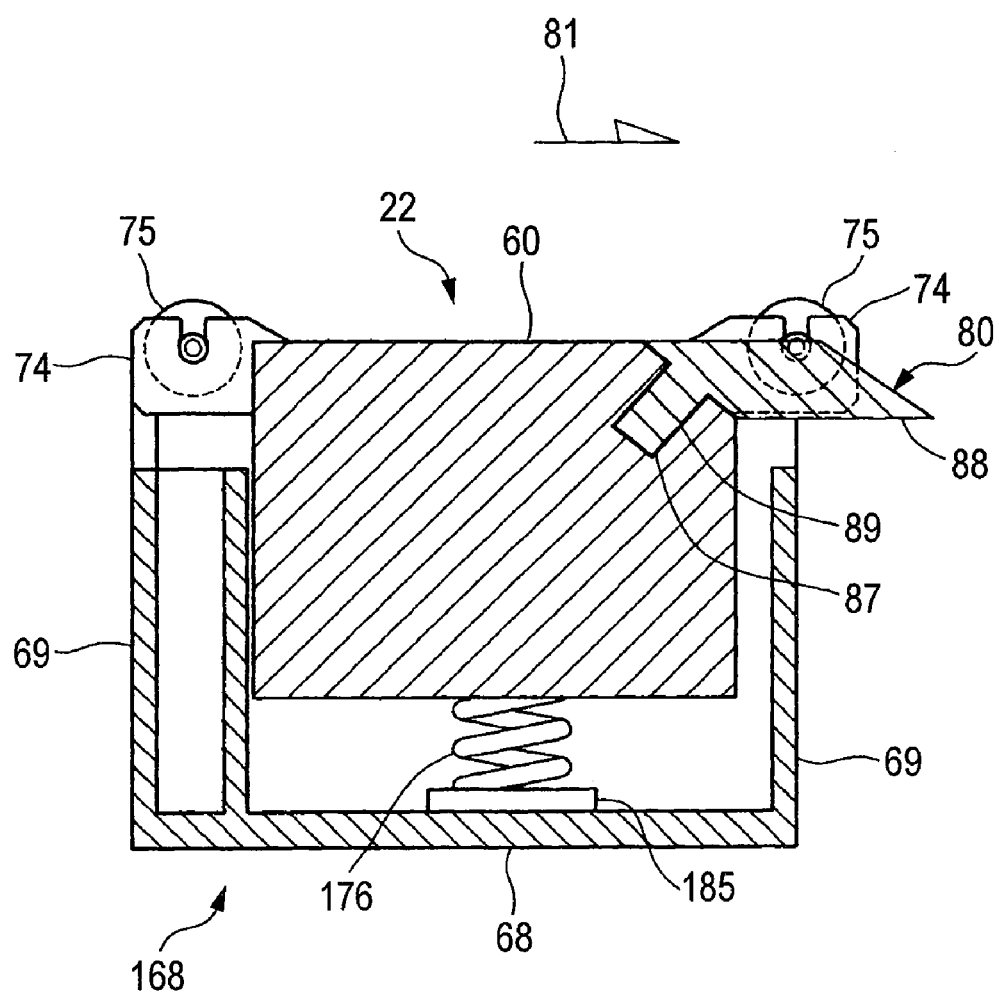
FIG. 16 is an exemplary schematic view of an inclined member 88 that is another example of a guiding unit according to another illustrative aspect.
Figure 17:
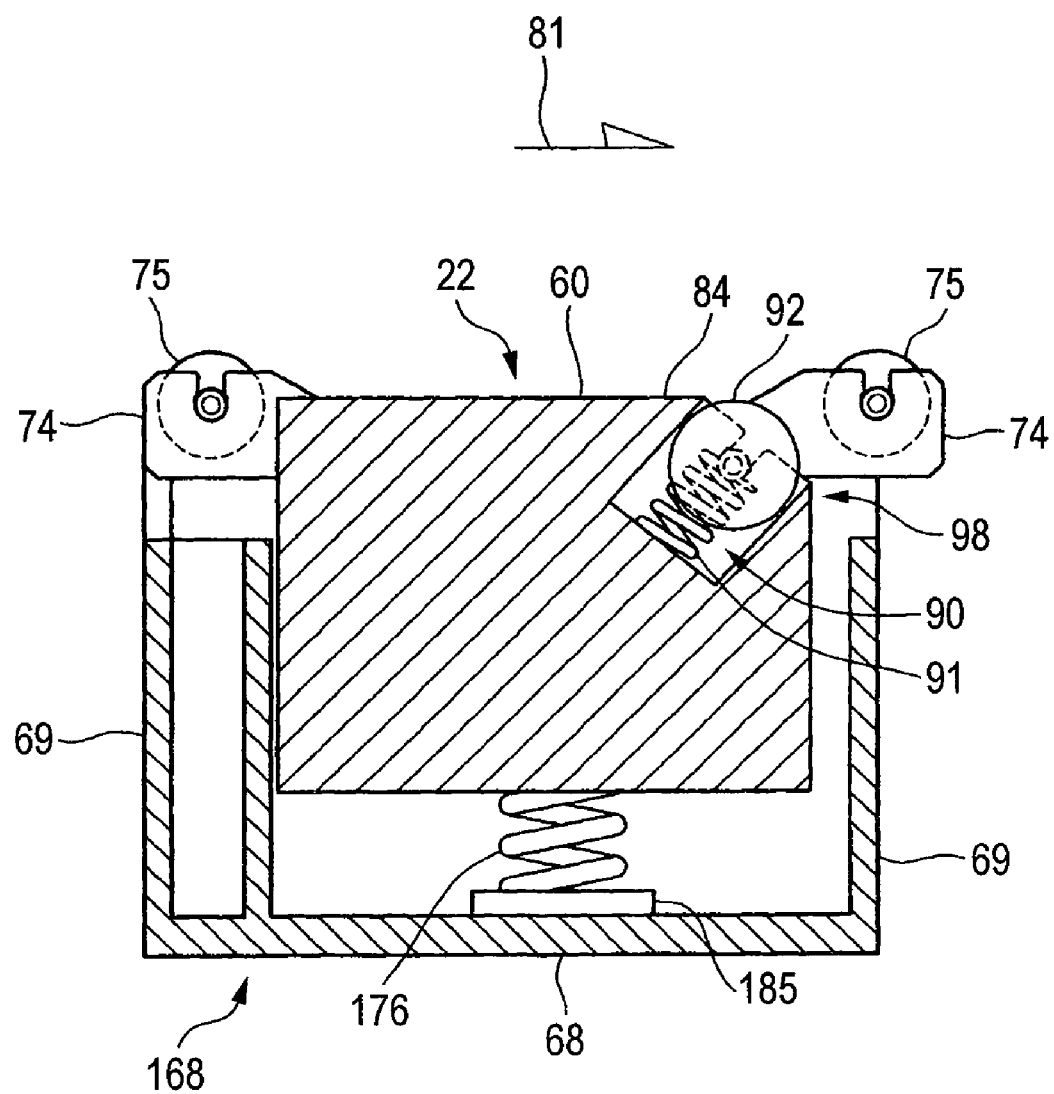
FIG. 17 is illustrative aspect schematic view of a roller mechanism 93 that is another example of the guiding unit according to another illustrative aspect.

When in a case where such a step 18 is formed, the image reader 22 moves from the home position to the glass 20 side as shown in FIG. 15A, the movement is obstructed by the step 18. However, with the image reader 22 of the image reading apparatus 1 according to the present illustrative aspect, because the inclined surface 80 is formed on the housing 61, the inclined surface 80 contacts the step 18 and the image reader 22 is thereby guided smoothly from the step 18 to the lower surface of the glass 20. Specifically, when the image reader 22 is moved in the direction of an arrow 85 that is parallel to the lower surface of the glass 20 and the inclined surface 18 contacts the step 18, the image reader 22 receives a reaction force from the step portion. Although this reaction force acts in the direction opposite the arrow 85, due to the inclined surface 80, a portion of the reaction force is made to act in the direction of pushing the image reader 22 downward (see FIG. 15B). By this acting force, the coil springs 176 that support the image reader 22 from the bottom surface of the carriage 168 become compressed and the image reader 22 retreats downward with the compression stroke of the coil springs 176 as the limit as shown in FIG. 15C. The image reader 22 is thereby made to pass across the step 18 and is guided to the lower surface of the glass 20. Due to such guiding, the impact due to collision against the step 18 is absorbed by the coil springs 176, thereby preventing damaging of the image reader 22 and consequently preventing fall-off of the image reader 22 from the carriage 168.

Although in the above description, the inclined surface 80 formed integral to the housing 61 and the inclined member fixed to the housing 61 are described as an example of the guiding unit. The inclined member is a member separate from the housing 61. A roller 92 is axially supported in a rotatable manner on the corner portion 82 of the housing 61. The roller 92 also serves as the guiding unit. Specifically, the guiding unit may include; a groove-like spring bearing portion 90 formed in the corner portion 82 of the casing 61; a coil spring 91 held in a manner enabling expansion and compression in the spring bearing portion 90; and a roller mechanism 93 axially supported in unillustrated bearing portions formed in both side walls of the groove-like spring bearing portion 90 while being urged by the coil spring 91. With such a guiding unit, because the impact upon collision against the step 18 can be absorbed by both the coil springs 176, disposed on the carriage 168, and the coil spring 91, disposed in the spring bearing portion 90, the impact from the step 18 can be absorbed further. Also, by the image reader 22 being guided by the rotation of the roller 92, smooth movement of the image reader 22 is realized.

According to the above-described illustrative aspect, the image reading apparatus may have an automatically transferred document reading function of reading an image of a document, transferred so as to pass across the moving document reading region on the first plate, during the transfer process, and a stationary document reading function of reading an image of a document placed on the stationary document reading region on the second plate. Both functions are realized by the image being read by the image reader that is disposed in the interior of the apparatus.

According to the above-described illustrative aspect, the partitioning member may be interposed between the first plate and the second plate. The first plate and the second plate are partitioned from each other by the partitioning member. The partitioning member has a guiding surface that guides a document that is moved on the first plate and serves a role of changing the orientation of the document toward a predetermined direction by contacting of the document with the guiding surface.

According to the above-described illustrative aspect, the image reader reads an image of a document on the first plate or the second plate based on reflected light from the document. The image reader is movably supported by the carriage that reciprocates along the lower surfaces of the first plate and the second plate inside the apparatus.

According to the above-described illustrative aspect, when a heavy document, such as a book document, etc., is placed on the stationary document reading region on the second plate, or a document on the second plate is pressed downward by a user, the second plate becomes deformed downward by the weight or the load. In this case, the end of the second plate at the partitioning member side becomes strongly curved downward, and a step portion that protrudes downward relative to the partitioning member and the first plate is formed. In this case, the carriage is moved and the image reader, supported on the carriage, moves along with the carriage, the guiding unit, disposed on the image reader contacts the step portion. A reaction force that the guiding unit receives from the step portion in the process of contact acts to make the image reader movable (move) downward. The image reader thus passes across the step portion smoothly and is guided to the lower surface of the second plate. As a result, damaging of the image reader due to collision against the step portion is prevented and consequently, fall-off of the image reader from the carriage is prevented.

According to the above-described illustrative aspect, when the image reader is moved and the inclined member disposed on the image reader contacts the step portion, the step portion rides on the inclined surface of the inclined member. In this process, a portion of a horizontal direction reaction force from the step portion that is applied to the inclined member is dispersed downward. The dispersed downward force acts to move the image reader in the downward direction. The image reader is thereby guided readily and smoothly from the step portion to the lower surface of the second plate. Also, because an impact that acts on the image reader in the horizontal direction is reduced, damaging of the image reader and fall-off of the image reading are prevented.

According to the above-described illustrative aspect, the number of parts can thereby be reduced, and the parts management cost and apparatus assembly cost can be lowered.

According to the above-described illustrative aspect, the inclined member can be mounted onto the housing by forming the fitting groove in the housing without accompanying a design change of the housing.

According to the above-described illustrative aspect, the frictional force that arises when the inclined surface rides on and slides along the step portion is reduced the image reader can be guided to the lower surface of the second plate more smoothly.

According to the above-described illustrative aspect, when the image reader is moved and a roller surface of the roller body contacts the step portion, the horizontal direction reaction force that is applied to the image reader acts in a direction of rotating the roller body and acts so as to move the image reader, which is disposed so as to be movable upward and downward, in the downward direction. The image reader is thus guided smoothly from the step portion to the lower surface of the second plate. Also, because the horizontal direction impact that acts on the image reader is decreased, damaging of the image reader and fall-off of the image reader are prevented.

According to the above-described illustrative aspect, the guiding unit may be disposed on at least one end in the movement direction of the opposing surface of the image reader that opposes the first plate and the second plate. The guide unit may thus be disposed at both ends in the movement direction.

According to the above-described illustrative aspect, ends of boundary portions, at which the first plate and the second plate are adjacent each other, are not supported while the other ends are supported, a central portion of the boundary portion of the second plate becomes deformed downward the most when a heavy document is placed on the second plate. The guiding unit is thus preferably disposed at a substantially central portion in a longitudinal direction of the image reader.

According to the above-described illustrative aspect, the guiding unit may be disposed at a front end in a movement direction of the image reader that moves from the first plate side toward the second plate side. When the image reader moves from the first plate side toward the second plate side, the housing of the image reader contacts the above-described step portion. The arrangement, with which the guiding unit is disposed at the front end in the movement direction, may be applied for reliably realizing guiding from the step portion to the lower surface of the second plate.

According to the above-described illustrative aspect, when during movement of the image reader, the guiding unit, disposed on the image reader, contacts the step portion, the image reader is made movable downward by the reaction force received from the step portion. By the image reader being moved in the downward movable state, the image reader passes smoothly across the step portion and is guided to the lower surface of the second plate. As a result, damaging of the image reader due to collision against the step portion is prevented and consequently, fall-off of the image reader from the carriage is prevented.

What is claimed is:

1. An image reading apparatus comprising:
    a first plate including a stationary document reading region;
    an image reader configured to scan a document on the first plate;
    a carriage supporting the image reader in a state that the carriage keeps the image reader a predetermined distance from the first plate; and
    a guiding member that makes the image reader move downwardly by contacting an edge of the first plate.

2. The image reading apparatus according to claim 1, comprising:
    a second plate including a moving document region; and
    a partitioning member interposed between the first plate and the second plate.

3. The image reading apparatus according to claim 2, wherein the moving document reading region is an exposed surface of the second plate, and
    wherein the moving document reading region is provided for scanning the document passing through the second plate.

4. The image reading apparatus according to claim 2, wherein the image reader has an opposing surface opposite to the first plate and the second plate,
    wherein the guiding member continuously extends from an end portion of the opposing surface of the image reader in a sub scanning direction of the image reader,
    wherein the guiding member is an inclined member including an inclined surface, and
    wherein the inclined surface of the inclined member is at least partly inclined along a direction in which the guiding member separates from the lower surface of the second plate.

5. The image reading apparatus according to claim 4, wherein the inclined member is integrally formed on a surface of a housing of the image reader.

6. The image reading apparatus according to claim 5, wherein the inclined surface of the inclined member is at least partly formed of a material with a high slidability.

7. The image reading apparatus according to claim 4, wherein the inclined member is attached to a housing of the image reader.

8. The image reading apparatus according to claim 7, wherein the inclined surface of the inclined member is at least partly formed of a material with a high slidability.

9. The image reading apparatus according to claim 4, wherein the inclined surface of the inclined member is at least partly formed of a material with a high slidability.

10. The image reading apparatus according to claim 2, wherein the image reader has an opposing surface relative to the first plate and the second plate,
    wherein the guiding member is disposed at an end portion of an opposing surface of the image reader in a sub scanning direction of the image reader, and
    wherein the guiding member comprises a roller body which is rotatably supported by a housing of the image reader.

11. The image reading apparatus according to claim 10, wherein the roller body is movable in a substantially vertical direction.

12. The image reading apparatus according to claim 1, wherein the stationary document reading region is an exposed surface of the first plate, and
    wherein the stationary document reading region is provided for scanning the document that is placed on the first plate.

13. The image reading apparatus according to claim 1, wherein the guiding member is disposed on at least one end of an end portion of the image reader along a sub scanning direction of the image reader.

14. The image reading apparatus according to claim 13, wherein the guiding member is disposed at a front end in a sub scanning direction of the image reader in which the image reader moves from a first plate side toward a second plate side.

15. The image reading apparatus according to claim 1, wherein the guiding member is disposed at a substantially central portion in a main scanning direction of the image reader.

16. The image reading apparatus according to claim 15, wherein the guiding member is disposed at a front end in a sub scanning direction of the image reader in which the image reader moves from a first plate side toward a second plate side.

* * * * *

UNITED STATES PATENT AND TRADEMARK OFFICE
CERTIFICATE OF CORRECTION

| | | |
|---|---|---|
| PATENT NO. | : 7,755,810 B2 | |
| APPLICATION NO. | : 11/749272 | |
| DATED | : July 13, 2010 | |
| INVENTOR(S) | : Kazutoshi Kuse | |

It is certified that error appears in the above-identified patent and that said Letters Patent is hereby corrected as shown below:

On the Title Page, in the Assignee address (73):
        Please remove "Aichi-shi" and replace with --Aichi-ken--.

Signed and Sealed this
Thirty-first Day of May, 2011

David J. Kappos
*Director of the United States Patent and Trademark Office*